US007287003B2

United States Patent
Hodson et al.

(10) Patent No.: US 7,287,003 B2
(45) Date of Patent: Oct. 23, 2007

(54) INTEGRATED ELECTRONIC SHOPPING CART SYSTEM AND METHOD

(75) Inventors: David Hodson, Palo Alto, CA (US); Ryan Bell, Mountain View, CA (US); Michael Rubin, San Francisco, CA (US); Karteek Patel, San Jose, CA (US)

(73) Assignee: Iprint.com, Redwood City, CA (US)

( * ) Notice: Subject to any disclaimer, the term of this patent is extended or adjusted under 35 U.S.C. 154(b) by 394 days.

(21) Appl. No.: 09/872,514

(22) Filed: Jun. 1, 2001

(65) Prior Publication Data

US 2002/0052806 A1    May 2, 2002

(51) Int. Cl.
    G06Q 30/00    (2006.01)
(52) U.S. Cl. .................................................... 705/26
(58) Field of Classification Search .................. 705/26
    See application file for complete search history.

(56) References Cited

U.S. PATENT DOCUMENTS

| 5,895,454 | A | | 4/1999 | Harrington ................... 705/26 |
| 5,966,697 | A | * | 10/1999 | Fergerson et al. ............ 705/26 |
| 6,125,352 | A | * | 9/2000 | Franklin et al. .............. 705/26 |
| 6,629,079 | B1 | * | 9/2003 | Spiegel et al. ................ 705/26 |
| 6,925,444 | B1 | * | 8/2005 | McCollom et al. ........... 705/14 |

(Continued)

FOREIGN PATENT DOCUMENTS

WO    WO/00/31657    *    6/2000

OTHER PUBLICATIONS

Snaz.com, "Snaz.com annonces its inititive to launch the worlds first universal shopping cart" Business wire, Mar. 7, 2000.*

(Continued)

*Primary Examiner*—Mark Fadok
(74) *Attorney, Agent, or Firm*—William G. Goldman; DLA Piper US LLP

(57) ABSTRACT

Integrated shopping cart functionality is provided on a first website so that products/services from different affiliated websites can be integrated into the shopping cart at the first website and the e-commerce functionality of the first website can be utilized to purchase the selected products/services. A framework for integrating this functionality enables the first website to integrate with affiliated websites so that an increased number of users may access the first website since the proprietor of the first website may offer various products/services from a multitude of different affiliated websites, for example by providing URL links to the affiliated websites that a user may access in order to select items from the affiliated websites. These items can be integrated into the shopping cart at the first website and purchased with a single transaction. Increased user traffic is expected at the first website since a user's shopping interests can be fulfilled at a single website. Additionally, affiliated websites are benefited by this integrated shopping cart functionality since the e-commerce functionality of the integrated shopping cart is performed by a server that is associated with the first website. Therefore, affiliated websites need not include their own e-commerce functionality. Instead, they may take advantage of the e-commerce functionality of the first website and still receive the benefits of the sale of their offered products/services to the user. Maintenance costs and overhead costs with respect to including an e-commerce software engine are therefore reduced and often eliminated as a result.

10 Claims, 15 Drawing Sheets

U.S. PATENT DOCUMENTS 6,980,962 B1 * 12/2005 Arganbright et al. ......... 705/26
2005/0210022 A1 * 9/2005 Philippe et al. ................ 707/4

OTHER PUBLICATIONS

Thomas Content, "E-retailers try to make it easier for shoppers to buy", USA Today, Dec. 22, 1999.*

PR Newswire, "RedCart.com annonces web's first univeersal shopping cart", Nov. 22, 1999.*

*BuyWiz Lightens the Load on Online Shoppers*, Mary Hillebrand, eCommerce Times.

*BuyWiz Unveils Universal Shopping Cart*, ECG Commerce-Guide.com Sponsored by IBM.

* cited by examiner

| BuyWiz Shopping List | | |
|---|---|---|
| MENU | | |
| NAME | PRICE | SITE |
| 50 wa comic books all new | $50.00 | www.ebay.com |
| Mushrooms: 6 Wonderful Stamps and... | $5.50 | www.ebay.com |
| Mushrooms: 6 Marvelous Stamps and... | $5.50 | www.ebay.com |
| VHR Watchwere and la Piccionlion | $39.99 | www.barnesandnoble.c |
| Encarta World English Dictionary | $35.00 | www.barnesandnoble.c |
| Hearts in Atlantis | $16.80 | www.barnesandnoble.c |
| Flu | $12.59 | www.barnesandnoble.c |
| The DK Children's Illustrated Encyclo... | $27.95 | www.barnesandnoble.c |
| Tin House Magazine, Premiere Issue | $9.95 | www.barnesandnoble.c |
| Miss Spider Backpack | $34.95 | www.barnesandnoble.c |

Tester Tester
- My Shopping List
- From Friends
- Purchased Items
- Deleted Items

Illustration 1. The BuyWiz Universal Shopping Cart contains items to be purchased from multiple merchants ns shopping system for a user to order and purchase items and more particularly to a system and method for providing an electronic shopping system having an integrated shopping cart functionality.

INTEGRATED ELECTRONIC SHOPPING CART SYSTEM AND METHOD

The present invention relates to an online shopping system for a user to order and purchase items and more particularly to a system and method for providing an electronic shopping system having an integrated shopping cart functionality.

BACKGROUND OF THE INVENTION

As the Internet is becoming more commercially oriented, product and service providers are exploring new ways to promote and sell a wide range of their products and services. Such efforts to date have generally taken the form of a vendor (or vendor company) establishing a website on a machine (computer or server) connected to the Internet.

The websites generally have a product display and purchase functionality integrated therein. A website is, in general terms, a server application running on a computer which accepts connections from client programs. Client programs, such as browsers, allow a remote user to access the information stored on the website. The information can include a broad range of multimedia data including textual, graphical, audio, and animation information. A common client application is in the form of a web browser, which, via mouse, keyboard or command line input, allows a user to access and "navigate" around the website.

Internet-based retail has become extremely popular over the last several years. Both business-to-business and business-to-consumer retail channels have benefited from the advances made in e-commerce technology, enhanced transaction security and improved data bandwidth.

Online retailing can be traced through three generations of commerce-enabling software. Initially, simple HTML forms were utilized by retail websites to facilitate online transactions between users and the proprietor of a website. Users were free to indicate their orders on these HTML forms. However, the forms were generally only suitable for indicating a few items of interest. When more than a few items were indicated, the HTML forms became difficult to manage and inefficient, since the order form was separate (on a different HTML form page) from the item description.

The next generation in online retailing involved "shopping cart" software. An electronic shopping cart is simply a computer software program that operates as an online retail website's catalog and ordering process. Typically, the shopping cart functions as the interface between the website and the user, allowing users to select merchandise, review the merchandise that has been selected, make any modifications or additions to the selected merchandise and purchase the selected merchandise. Shopping cart software is similar to a physical shopping cart, such as that commonly found in a grocery store, in the sense that selected items for purchase may be commonly grouped together in the shopping cart and purchased with a single transaction. In an online environment, a user can select an item of interest for purchase as the user browses through a website and can choose to "place" the selected item in the shopping cart. The software remembers the selected items during the user's browsing and even maintains a running total of the purchase price.

However, while electronic shopping carts are useful and have resulted in increasing the simplicity of online retailing, conventional shopping cart software is limited as an electronic commerce tool. This limitation resulted in the development of the third generation of online retailing software, "storefront" or "store building" software. Websites constructed with this software include conventional shopping cart functionality and also allow the website proprietor to add, delete, or temporarily hide products on the website, change product prices, set up sales and promotions, provide secure transaction features, manipulate graphics, and integrate the online operations with existing physical accounting and inventory systems.

Regardless of the generation of e-commerce software implemented on a website, information about the products and services offered at a particular website is generally maintained in an online database usually resident in the server that maintains the website. The database may contain fields such as product name, SKU (stockkeeping unit, an identification of a particular product that allows it to be tracked for inventory purposes), descriptive text, price, weight (to calculate shipping), and the electronic file name of an item photograph or other identification information of an item.

Since a website is often navigated by more than a single user at any given time, a different shopping cart is associated with each user. For example, a cookie file (small computer file) that contains a user's shopping cart identification information, such as shopping cart number, may be transmitted to the user's own Web browser software resident on the user's computer system and may remain stored on the user's hard drive during the entire visit at the website (and may even remain stored on the user's hard drive after the user leaves the website or terminates an Internet session). Cookies are therefore an efficient tool for maintaining the association between the user and the shopping cart and are implemented by most e-commerce software.

Alternatively, e-commerce software programs may utilize a temporary Internet Protocol (IP) number, that is automatically assigned to a user by the user's ISP (Internet Service Provider) when the user logs onto the Internet, as an identifier to associate a particular shopping cart with a user. Also, a randomly generated shopping cart number may be appended to the URL (Universal Resource Locator) appearing in the "Location" or "Address" field of the user's browser software. In such case, whenever the user navigates to a different product page of the website, the cart number, being appended to the URL, effectively "follows" the consumer through the site.

Regardless of the particular software program utilized, integrated shopping carts are highly desirable electronic commerce software applications. Using an integrated shopping cart allows a user to select items from a number of different websites, collect the items in a single integrated shopping cart and purchase the items with a single transaction. While highly desirable, integrated shopping carts have been difficult to implement.

Therefore, universal shopping carts have typically become popularized. One such universal shopping cart is available from BuyWiz Software. Using BuyWiz's universal shopping cart, users can collect items from various online stores and save the selected items in a single shopping cart that resides on the user's personal computer instead of being integrated with a particular website. The cart's contents can be viewed, either on-line or off-line, and the user can receive sales or price change notifications, and purchase some or all of the items via a single click using a single central registration form.

The BuyWiz shopping cart works in conjunction with a shopping server/service offered by BuyWiz Software. When a user browses a BuyWiz-supported merchant website and arrives at a purchase page of the website, such as a webpage that contains an action for adding an item to the shopping cart, the BuyWiz "shopping bag" automatically appears on the user's display. FIG. 1 is a sample screenshot of the BuyWiz shopping bag 10. Using an input device of the computer, such as initiating a single click of the mouse, the user can select an item to be "placed" in the shopping bag 10 where it appears with all of the other items in the shopping bag 10.

If the selected item is from a merchant that is supported by BuyWiz Software, the user can choose to purchase the item and the BuyWiz server fills in the requisite registration forms with the user's fixed information, such as name and address and credit card information. Once an item is "placed" in the shopping bag, the BuyWiz server continually monitors that item's pricing on the merchant website, posting any price changes directly to the shopping bag display interface. Since BuyWiz's shopping bag is an independent software program that remains resident on a user's computer and the participating websites can support its functionality, the shopping bag is not integrated into the e-commerce functionality of those websites. As such, BuyWiz's shopping bag software incorporates its own e-commerce functionality in order to process product and service orders thereby adding complexity and overhead to the software. In effect, any commercial transactions are handled by the website from which the product or service was selected. Thus, the universal shopping cart does not eliminate the need for e-commerce functionality to be a part of the websites.

Other solutions to providing a universal e-commerce shopping experience have been proposed. One such solution is proposed in U.S. Pat. No. 5,895,454, that issued Apr. 20, 1999, to Harrington (herein the "'454 patent"). The '454 patent discloses a method of effecting commerce in a networked computer environment. A database of vendor product data and an associated database interface that allows remote access by one or more users is established. A local user interacts with the database by querying the database to specify a local user's product/service specification (a search request to locate a particular product or service of interest). In response to the query, the database provides the local user with a selection of remote vendor network websites. After the local user interactively connects with one or more of the remote vendor network sites, the user selects products/ services from the information provided on the remote vendor network website. The selection of a particular product/ service triggers a transaction notification which records the user's selection and associated financial transaction data which is transmitted to the database and associated database interface. During, or at the conclusion of, a local user's shopping session, the user confirms the selection(s) whereby the database and associated database interface transmits purchase/order data to the remote vendor sites corresponding to the user's selection.

The '454 patent proposes to establish a "virtual shopping mall" of affiliated member vendor websites so that a user can peruse the various products and services offered from the vendors at a single location. For example, affiliated member vendor websites may establish an electronic list (including images and textual description, etc.) of products/services offered for purchase and provide the electronic list to a database administrator so that a product/service database can be maintained including the products/services indicated in the electronic list from the vendor websites. A user can search the database to locate desired items and select desired items from a website for purchase. Accordingly, each product/service selected from a particular vendor website can only be purchased through that first website using the e-commerce functionality of that first website. Other products and services from other vendor websites cannot be purchased through the first website. In order to purchase a different product or service from another vendor website, the user must access that second vendor website and purchase the item through the second website, using the e-commerce functionality of the second website.

Thus, while the '454 patent provides an efficient "window shopping" aspect to e-commerce, it does not address the inefficiencies resulting from causing a user to conduct multiple purchases at different websites instead of allowing the user to select from multiple vendor items and aggregate the selected items into a single integrated shopping cart so that the selected items can be purchased in a single transaction.

Unfortunately, electronic shopping carts have been predominantly localized to distinct websites. They have not been implemented to function across different websites. As such, electronic commerce is stifled, because the user cannot commonly gather all of the desired products and services across any website in an integrated shopping cart and purchase all of the selected items with a single transaction. Instead users are generally forced to conduct separate transactions at each website, each having their own electronic shopping cart in which users can "place" and purchase selected items from that website. It is desirable, then, to provide an integrated shopping cart that can be implemented across any website. It is to this end that the present invention is directed.

SUMMARY OF THE INVENTION

In accordance with the invention, integrated shopping cart functionality is provided on a first website so that products/ services from different affiliated websites can be integrated into the shopping cart at the first website and the e-commerce functionality of the first website can be utilized to purchase the selected products/services.

Advantageously, the first website is benefited by this integrated shopping cart functionality in that an increased number of users may access the first website since the proprietor of the first website may offer various products/ services from a multitude of different affiliated websites, for example by providing URL links to the affiliated websites that a user may access in order to select items from the affiliated websites. These items can be integrated into the shopping cart at the first website and purchased with a single transaction. Increased user traffic is expected at the first website since a user's shopping interests can be fulfilled at a single website.

Additionally, affiliated websites are benefited by this integrated shopping cart functionality since the e-commerce functionality of the integrated shopping cart is performed by a server that is associated with the first website. Therefore, affiliated websites need not include their own e-commerce functionality. Instead, they may take advantage of the e-commerce functionality of the first website and still receive the benefits of the sale of their offered products/ services to the user. Maintenance costs and overhead costs with respect to including an e-commerce software engine are therefore reduced and often eliminated as a result.

BRIEF DESCRIPTION OF THE DRAWINGS

FIG. 1 is a sample screenshot of an electronic shopping bag display interface offered by BuyWiz;

DETAILED DESCRIPTION OF THE PREFERRED EMBODIMENT

Figure 2:
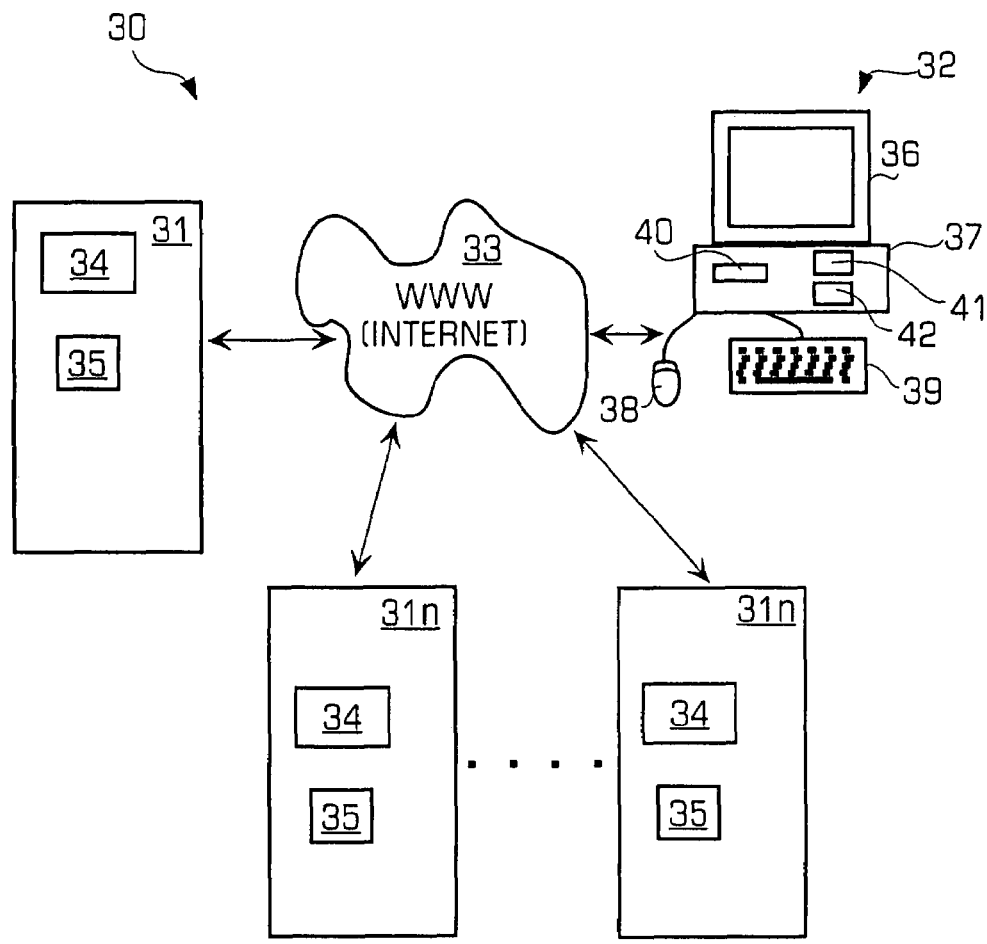
FIG. 2 shows a schematic diagram of an integrated shopping cart system in accordance with the invention.

FIG. 2 shows a schematic diagram of an integrated shopping cart system 30 in accordance with the invention. The system 30 may include a first server 31 (website) connected with one or more clients 32 across a wide area network (WAN) 33, such as the Internet, or more particularly, the World Wide Web. The first server 31 may contain one or more pieces of software code 34 that may be stored on the first server 31 and may be executed by a microprocessor 35 in the first server 31 in order to operate as the integrated shopping cart system 30 of the invention. The Internet 33 permits the first server 31, when accessed by an individual client 32, to display a web page on the client computer system 32 which permits the client 32 to interact with the first server 31.

The client computer system 32 may include a display device 36, a chassis 37, and one or more user input devices, such as a mouse 38 and a keyboard 39. The chassis 37 may house a permanent storage system 40, such as a hard disk drive, optical disk drive, tape drive, or the like, which may store one or more software applications such as a web browser application. The client computer system may have a memory 41 resident therein and the software application from the disk 40 may be transferred to the memory 41 to be executed by a CPU 42 in the computer system. The browser application may be configured to connect the client 32 to the first server 31 over the WAN 33 and receive graphical information (web pages) that may be displayed on the display device 36 to the user. The browser application may also permit the client 32 to interact with the first server 31 such as by selecting a particular product or service from the first server 31 for purchase or by allowing a user to access additional affiliated websites and their associated servers 31n, such as by the user selecting an associated URL link on the first website.

In accordance with the invention, the first server 31 may be associated with a first vendor website and may be in communication with a multitude of additional affiliated servers 31n, the additional servers 31n being associated with particular vendor websites. Alternatively, a multitude of vendor websites may be provided on a single server 31. A user may, while accessing a particular website, select products and/or services for purchase from that website, as will be described in more detail herein, and also may "navigate" among the additional servers 31n to access an affiliated website in order to select products and/or services for purchase from one of the affiliated websites. In accordance with the invention, the integrated shopping cart system 30 allows the products and/or services selected by a user from the affiliated website(s) to be incorporated into an electronic shopping cart at the first website so that the e-commerce functionality of the first website can be utilized by the affiliated websites.

In order to function as the integrated shopping cart system 30 of the invention, the first website server 31 and any affiliated website servers 31n include an integrated shopping cart software module 50. The integrated shopping cart software module 50 will now be described with reference to particular software sub-modules which are shown in FIG. 3.

Figure 3:
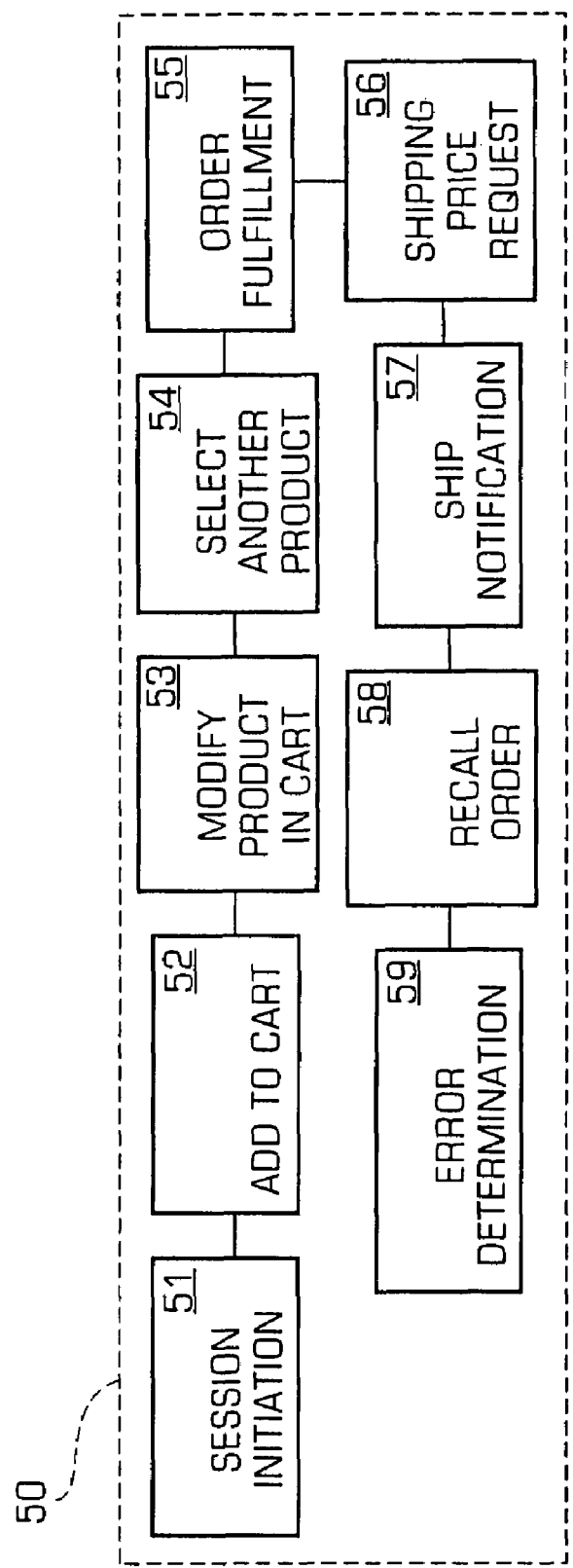
FIG. 3 is a block diagram representation of an integrated shopping cart software module in accordance with the invention.

With reference to FIG. 3, the integrated shopping cart software module 50 may include a session initiation software sub-module 51 for initiating a communication session between an affiliated website server 31n and the first website server 31. The session initiation sub-module 51 allows the first website server 31 to transmit request information to an affiliated website server 31n, such as passing website identifier information to the affiliated website server 31n. The request information may be transmitted according to known communication protocols, such as an HTTPS POST (encrypted) command, an HTTP POST command, an HTTP GET command, an HTTPS GET (encrypted) command, or any other similar command protocol.

In order for the affiliated website server 31n to identify the first website server 31, a vendor identifier assigned to the first website server 31 is transmitted by the sub-module 51 to the affiliated website server 31n. In accordance with the invention, a vendor identifier can be assigned to each website to which the integrated shopping cart system 30 functionality is provided. The vendor identifier may include a sequence of numbers, letters and special characters such that a vendor can be properly identified by the system. Additionally, a product identifier is transmitted by the software sub-module 51 to the affiliated website server 31n so that an associated product or service can be selected for purchase from the affiliated website. Optionally, one or more session identifiers may be transmitted by the software sub-module 51 so that communication sessions between the servers 31, 31n can be tracked and maintained, as well as a user identifier for a particular vendor. The user identifier enables the system to determine whether a user is logged onto a particular vendor's account management system and redirect the user to the appropriate website if necessary. This may also be accomplished via cookie functionality.

The integrated shopping cart software module 50 may also include an add-to-cart software sub-module 52 for informing the first website of an addition to the user's shopping cart. In accordance with the invention, the add-to-cart software sub-module 52 may transmit selected product/service information to the first website server 31 so that the selected product/service may be properly added to the user's shopping cart at the first website.

A number of parameters may be transmitted by the sub-module 52 to the first website server 31 so that the selected product/service can be properly added to the shopping cart at the first website. For example, parameters include, but are not limited to, a reference parameter that indicates a user's order, line item number that indicates a particular location in the shopping cart at which to add the item, quantity, weight, inventory number, line item description, total line item price, session identifier information, and user identifier information.

The reference parameter identifies a selected product or service from an affiliated website to be added to the shopping cart at the first website. The line item parameter identifies a particular location in the shopping cart from which to add the selected product/service information. Quantity and weight parameters are self explanatory and identify the quantity of the selected product/service and the weight of the selected item. The inventory number parameter is also self explanatory and allows a vendor's inventory information to be updated and maintained. The line item description parameter associates an indicated textual string, graphic, or other identification information with the selected product/service so that the product/service in the shopping cart can be identified by the user. The total line item price parameter indicates the total cost of the selected product or service (generally a function of quantity and weight and base price information) so that a proper shopping cart total can be calculated by the system 30. The information may be transmitted, for example, via HTTPS as an XML message from the affiliated website server 31n to the first website server 31. Other transmission protocols, such as FTP, e-mail, HTTP, and HTTPS (among others) could be used without departing from the invention.

The communication flow between the first website server 31 and the affiliated website server 31n is as follows. Upon a user selecting a product/service from an affiliated website to be added to the shopping cart at the first website, the affiliated website server 31n contacts the first website server 31, such as via the HTTPS secure communication protocol. Upon connecting with the first website server 31, the affiliated website server 31n sends a message, such as an XML message that may include the parameter information indicated above, to the first website server 31. Upon receiving the message, the first website server 31 may acknowledge receipt of the message and the user may be redirected to a predetermined or dynamic URL on the first website server 31 so that the user can return to the first website in order to either perform additional selecting of items from the first or other affiliated websites or so that the user can conclude an order.

As described, the first website server 31 may acknowledge receipt of the message transmitted from the affiliated website 31n. The acknowledge message may be transmitted as an XML message, or any other communication format, from the first website server 31 to the affiliated website server 31n and may include the reference parameter information as well as status information, such as whether the selected item was successfully added to the shopping cart at the first website.

The integrated shopping cart software module 50 may also include a modify-product-in-cart software sub-module 53 for informing an affiliated website server 31n of a request by the user at the first website to modify an item in the shopping cart at the first website. The request information may be transmitted by the first server 31 to the affiliated website server 31n according to known communication protocols, such as an HTTPS POST command. A number of parameters may be transmitted by the first server 31 to the affiliated website server 31n so that the affiliated website server 31n can identify the product/service in the shopping cart requested by the user to be modified. For example, as described above, parameters may include a vendor identifier, reference parameter, line item number and action information (such as a modify an item request). Optionally, session identifier information may be transmitted by the first server 31, as well as a user identifier for a particular vendor. The modify software sub-module 53 may also be used to recall and modify a previously identified order request or a previously saved work. For example, a user accessing the affiliated website may initiate an order by choosing a particular item to be added to the shopping cart, yet may leave the website prior to fulfilling the order. In such a case, the previously chosen items may be recalled and the order or saved work may be modified accordingly.

The integrated shopping cart software module 50 may also include a create-another-item software sub-module 54 for informing the affiliated website server 31n of a request by the user at the first website to create another item for purchase. The request information may be transmitted by the first server 31 to an affiliated website server 31n according to known communication protocols, such as an HTTPS POST command. A number of parameters may be transmitted by the first server 31 to the affiliated website server 31n so that another item can be created by the user from the affiliated website. For example, as described above, parameters may include the vendor identifier, reference parameter, product identifier, and action information (such as a select another item request). Optionally, session identifier information, line item number information, and a user identifier may be transmitted by the first server 31.

The integrated shopping cart software module 50 may also include an order fulfillment software sub-module 55 for informing the affiliated website server 31n of a request by a user at the first website to fulfill the user's shopping cart order. The request information may be transmitted by the first server 31 to the affiliated website server 31n according to known communication protocols, such as HTTPS via an XML message transmitted by the first server 31 to the affiliated website server 31n.

In order for the affiliated website server 31n to fulfill a user's order, shipping information is transmitted by the first server 31 to the affiliated website server 31n. Shipping information may include address and other contact information of the user, shipping company information, and shipping method information. Additionally, other parameter information, such as vendor identifier, reference parameter and line item information may be transmitted to the affiliate website server 31n so that the proper product/service can be identified by the affiliate website server 31n and shipped to the user, as well as vendor reference information. The information may be transmitted, for example via HTTPS as an XML message from the first website server 31 to the affiliated website server 31n. Other transmission protocols, such as FTP, e-mail, HTTP and HTTPS could be used without departing from the invention.

The communication flow between the first website server 31 and the affiliated website server 31n, as shown in FIG. 2, is as follows. Upon a user selecting to fulfill a shopping cart order, the first website server 31 contacts the affiliated website server 31n, such as via the HTTPS communication protocol. Upon connecting with the affiliated website server 31n, the first website server 31 sends a message, such as an XML message that may include the parameter information indicated above, to the affiliated website server 31n. Upon receiving the message, the affiliated website server 31n may acknowledge receipt of the message and the user's order may be fulfilled by the affiliated website server 31n.

As described, the affiliate website server 31n may acknowledge receipt of the message transmitted from the first website server 31. The acknowledge message may be transmitted as an XML message, or any other communication format, from the affiliate website server 31n to the first website server 31 and may include reference parameter information, line item parameter information and status information, such as whether the order was fulfilled and the expected ship date of the order.

The integrated shopping cart software module 50 may also include a shipping price request software sub-module 56 for informing the affiliated website server 31n of a request by the first server 31 for a shipping price of a selected item so that a user may be charged a correct price by the proprietor of the first website to fulfill a user's shopping cart order. The request information may be transmitted by the first server 31 to the affiliated website server 31n according to known communication protocols, such as HTTPS via an XML message transmitted to the affiliated website server 31n. In order for the affiliated website server 31n to determine the shipping cost for a selected item, item information and shipping information are transmitted to the affiliated website server 31n. Shipping information may include address and other contact information of the user, shipping company information, and shipping method information. Additionally, other parameter information, such as vendor identifier, reference parameter and line item information may be transmitted to the affiliate website server 31n so that a proper shipping price can be determined by the affiliated website server 31n. The information may be transmitted as an XML message from the first website server 31 to the affiliated website server 31n. Other transmission protocols, such as FTP, e-mail, HTTP and HTTPS could be used without departing from the invention.

The communication flow between the first website server 31 and the affiliated website server 31n, as shown in FIG. 2, is as follows. Upon a user selecting to fulfill a shopping cart order, the first website server 31 contacts the affiliated website server 31n, such as via the HTTPS communication protocol. Upon connecting with the affiliated website server 31n, the first website server 31 sends a message, such as an XML message that may include the parameter information indicated above, to the affiliated website server 31n. Upon receiving the message, the affiliated website server 31n may acknowledge receipt of the message and an accurate shipping cost determination may be returned to the first website server 31 so that a user's order can be fulfilled.

As described, the affiliated website server 31n may acknowledge receipt of the message transmitted from the first website 31. The acknowledge message may be transmitted as an XML message, or any other communication format, from the affiliated website server 31n to the first website server 31 and may include reference parameter information, line item parameter information, status information, and shipping price information so that a user's order can be accurately processed and fulfilled.

The integrated shopping cart software module 50 may also include a ship notification software sub-module 57 for informing the first website server 31 of the fulfillment of an order by the affiliated website server 31n, thereby allowing the first website server 31 to process electronic payment of a user's order. The notification information may be transmitted to the first website server 31 according to known communication protocols, such as HTTPS via an XML message transmitted to the first website server 31.

To notify the first website server 31 of shipping an order, the affiliated website server 31n may transmit parameter information to the first website server 31, such as line item information and reference parameter information. Optionally, tracking information may be transmitted to the first website server 31 so that a user's order may be tracked during shipping, and a vendor reference number may be transmitted to identify a vendor's order number for the item. The information may be transmitted as an XML message from the affiliate website server 31n to the first website server 31. Other transmission protocols, such as FTP, e-mail, HTTP and HTTPS, could be used without departing from the invention.

The communication flow between the first website server 31 and the affiliated website server 31n, as shown in FIG. 2, is as follows. Upon the shipping of a selected item, the affiliated website server 31n contacts the first website server 31, such as via the HTTPS communication protocol. Upon connecting with the first website server 31, the affiliated website server 31n sends a message, such as an XML message that may include the parameter information indicated above, to the first website server 31. Upon receiving the message, the first website server 31 may acknowledge receipt of the message.

As described, the first website server 31 may acknowledge receipt of the message transmitted from the affiliated website server 31n. The acknowledge message may be transmitted as an XML message, or any other communication format, from the first website server 31 to the affiliated website server 31n and may include reference parameter information and line item parameter information.

The integrated shopping cart software module 50 may also include a reorder software sub-module 58 for informing the affiliated website server 31n of a request to add a previously ordered product from the affiliated website to the user's current shopping cart order at the first website. The notification information may be transmitted to the affiliated website server 31n according to known communication protocols, such as an HTTPS request transmitted to the affiliated website server 31n.

In order to request the recall of a previously ordered item from the affiliated website server 31n, the first website server 31 may transmit parameter information to the affiliated website server 31n, such as vendor identifier, reference parameter, line item number, and action information to be performed, such as the recalling of a previously ordered item by the user. Optionally, session identifier information may be transmitted to the affiliated website server 31n, as well as vendor reference information.

The integrated shopping cart software module 50 may include an error determination software sub-module 59 for managing error information. The error information may be transmitted to the first website server 31 according to known communication protocols, such as an HTTPS request transmitted to the first website server 31.

In accordance with the invention, the first website server 31 may maintain a list of error code information to notify a user of the occurrence of an error during the selection, purchase or fulfillment of a user's shopping cart order. Upon encountering an error, the affiliated website server 31n transmits the error code information for an error type to the first server 31. The first server 31 may then compare the received error code against the error list and inform the user accordingly. Alternatively, the affiliated website server 31n may maintain its own list of error code information to notify a user of the occurrence of an error during the selection, purchase or fulfillment of a user's shopping cart order.

Additional software sub-modules may be incorporated into the integrated shopping cart software module 50 to customize the functionality of the integrated shopping cart system 30 for a particular affiliated website. Furthermore, additional embodiments of the invention may be provided that include various combinations of the sub-modules described above. Therefore, the integrated shopping cart functionality can be customized for every website in which it may be integrated.

Figure 4:
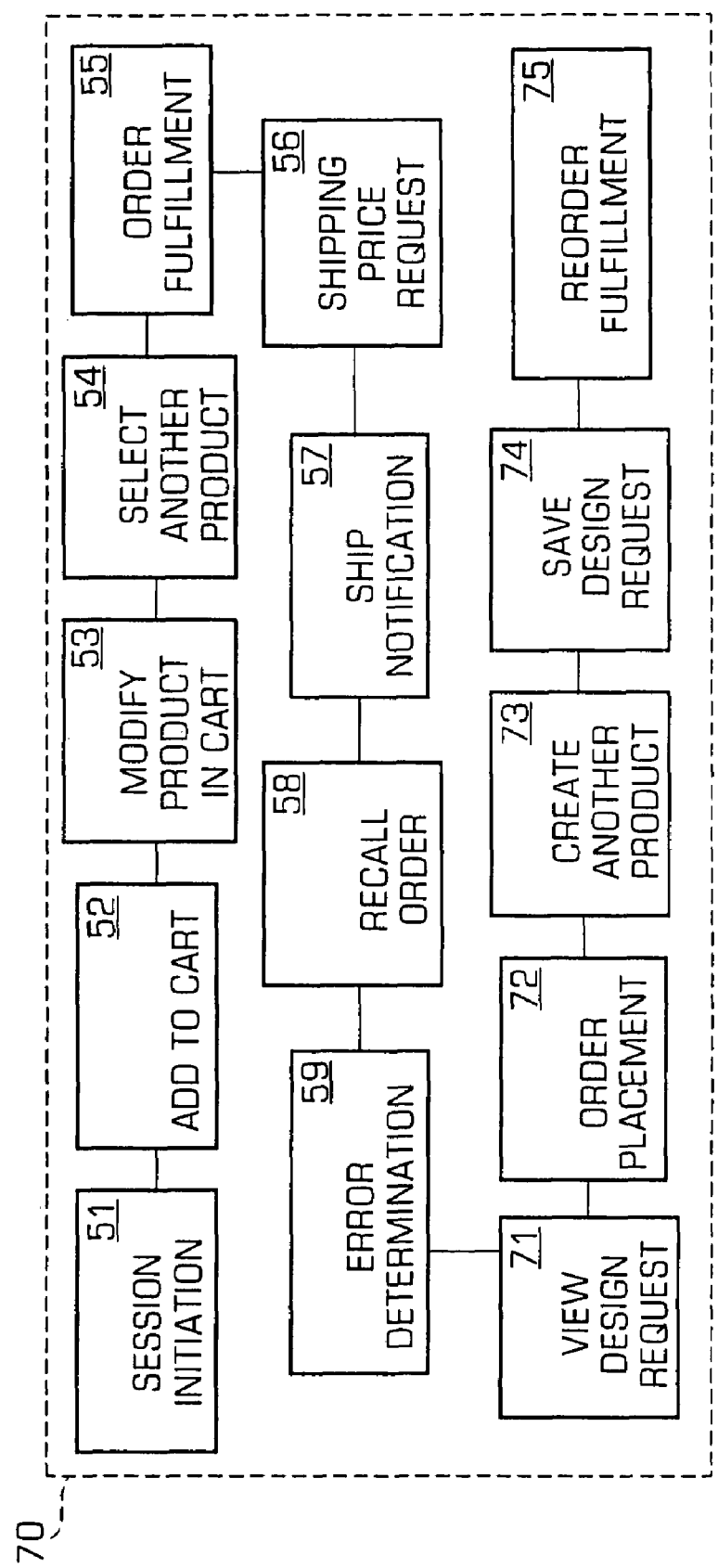
FIG. 4 illustrates an alternative block diagram embodiment of an integrated shopping cart software module in accordance with the invention.

FIG. 4 illustrates an alternative embodiment of the integrated shopping cart software module 50 shown in FIG. 3, in which like elements are represented by like reference numbers and need not be explained. The integrated shopping cart software module 70 shown in FIG. 4 may include additional software sub-modules, or a combination of the software sub-modules described herein, in order to customize the functionality of the integrated shopping cart system 30 for a particular affiliated website, such as an affiliated website that allows a user to create custom design items that may be printed on a wide array of media.

As shown in FIG. 4, the integrated shopping cart software module 70 may include a view design request software sub-module 71 for informing the affiliated website server 31n of a request by a user at the first website to view an image of a design item that may be or was previously created by the user at the affiliated website. The request information may be transmitted by the first server 31 to the affiliated website server 31n according to known communication protocols, such as an HTTPS command.

In order for the affiliated website server 31n to identify a requested design item, parameter information is transmitted by the first server 31 to the affiliated website server 31n. The parameter information may include vendor identifier, reference parameter, line item number and zoom factor information. The zoom factor parameter indicates a zoom factor used to display the requested design item image to the user. Preferably, the zoom factor may be on the order of 0.1× to 1× magnification, however, any zoom factor may be specified.

The communication flow between the first website server 31 and the affiliated website server 31n, shown in FIG. 2, is as follows. Upon a user requesting to view an image of a design item from the first website, the first website server 31 contacts the affiliated website server 31n, such as via the HTTPS communication protocol. Upon connecting with the affiliated website server 31n, the first website server 31 transmits a message, that may include the parameter information indicated above, and may include the URL of the first website, to the affiliated website server 31n. Upon receiving the message, the affiliated website server 31n may transmit an image of the requested line item to the first website server 31 that may be displayed to the user.

The integrated shopping cart software module 70 may also include a create another product software sub-module 73 for informing the affiliated website server 31n of a request by a user at the first website to create another custom designed item based on a present item located in the shopping cart. The request information may be transmitted by the first server 31 to the affiliated website server 31n according to known communication protocols, such as an HTTPS command.

In order for the affiliated website server 31n to identify a requested design item, parameter information is transmitted by the first server 31 to the affiliated website server 31n. The parameter information may include vendor identifier, reference parameter, product identifier, line item number and session identifier information. The product identifier information allows the affiliated server 31n to identify a particular product design item.

The communication flow between the first website server 31 and the affiliated website server 31n, shown in FIG. 2, is as follows. Upon a user requesting to create another design item from the first website, the first website server 31 contacts the affiliated website server 31n, such as via the HTTPS communication protocol. Upon connecting with the affiliated website server 31n, the first website server 31 transmits a message, that may include the parameter information indicated above, to the affiliated website server 31n. Upon receiving the message, the affiliated website server 31n may implement a design tool interface thereby allowing the user to create a custom design item and select the newly created item to be placed in the shopping cart at the first website. Depending on whether the line item number information is transmitted to the affiliated server 31n, the design tool interface may initiate a design item template based on the design format indicated by the line item number information. Alternatively, the design tool interface may initiate a design item template based, for example, on a previously selected design item by the user.

The integrated shopping cart software module 70 may also include a save design request software sub-module 74 for informing the first website server 31 that a user has chosen to save a custom design item on the affiliated website server 31n. The request information may be transmitted by the first server 31 to the affiliated website server 31n according to known communication protocols, such as HTTPS via an XML message.

In order for the affiliated website server 31n to notify the first server 31 of a saved design item, the affiliated server 31n transmits parameter information to the first server 31. The parameter information may include reference parameter, line item number, line item description information, user identifier information and session identifier information. The first server 31 may acknowledge receipt of the notification by transmitting an acknowledgement message to the affiliated server 31n.

The communication flow between the affiliated website server 31n and the first website server 31, shown in FIG. 2, is as follows. Upon a user requesting to save a custom design item on the affiliated server 31n, the affiliated website server 31n contacts the first website server 31, such as HTTPS as an XML message. Upon connecting with the first website server 31n, the affiliated website server 31n transmits a message, that may include the parameter information indicated above, to the first website server 31. Upon receiving the message, the first website server 31 may transmit an acknowledgement message back to the affiliated website server 31n. The acknowledgement message may include parameter information such as reference number information, and status information.

The integrated shopping cart software module 70 may include an order placement request software sub-module 72 for informing the affiliated website server 31n of a request by a user at the first website to fulfill an order for an item that was not selected at the affiliated website. For example, an order item may have been transmitted to the first server 31 by the user, such as from the user's own personal computer via a modem or other transmission means, or possibly selected from another affiliated server 31n by the user. The request information may be transmitted by the first server 31 to the affiliated website server 31n according to known communication protocols, such as HTTPS via an XML message.

In order for the affiliated website server 31n to identify a requested design item, parameter information is transmitted by the first server 31 to the affiliated website server 31n. The parameter information may include vendor identifier, reference parameter, line item number and shipping information. The information may be transmitted as an XML message from the first website server 31 to the affiliated website server 31n. Other transmission protocols, such as FTP, e-mail, HTTP and HTTPS, could be used without departing from the invention.

The communication flow between the first website server 31 and the affiliated website server 31n, shown in FIG. 2, is as follows. Upon a user requesting to fulfill an order at the first website, the first website server 31 contacts the affiliated website server 31n, such as via the HTTPS communication protocol. Upon connecting with the affiliated website server 31n, the first website server 31 transmits a message, that may include the parameter information indicated above, to the affiliated website server 31n. Upon receiving the message, the affiliated website server 31n may fulfill the order for the requested line item and may acknowledge the order fulfillment to the first website server 31 so that a user can be notified of the fulfillment of an order.

The integrated shopping cart software module 70 may also include a reorder fulfillment request software sub-module 75 for informing the affiliated website server 31n of a request by a user at the first website to fulfill a new order for a previously ordered item in the user's shopping cart order. The request information may be transmitted by the first server 31 to the affiliated website server 31n according to known communication protocols, such as HTTPS via an XML message transmitted by the first server 31 to the affiliated website server 31n.

In order for the affiliated website server 31n to fulfill a user's order, shipping information is transmitted by the first server 31 to the affiliated website server 31n. Shipping information may include address and other contact information of the user, shipping company information, and shipping method information. Additionally, other parameter information, such as vendor identifier, reference parameter, line item information and vendor reference information may be transmitted to the affiliate website server 31n so that the proper product/service can be identified by the affiliate website server 31n and shipped to the user. The information may be transmitted as an XML message from the first website server 31 to the affiliated website server 31n. Other transmission protocols, such as FTP, e-mail, HTTP and HTTPS could be used without departing from the invention.

The communication flow between the first website server 31 and the affiliated website server 31n, as shown in FIG. 2, is as follows. Upon a user selecting to fulfill a shopping cart order, the first website server 31 contacts the affiliated website server 31n, such as via the HTTPS communication protocol. Upon connecting with the affiliated website server 31n, the first website server 31 sends a message, such as an XML message that may include the parameter information indicated above, to the affiliated website server 31n. Upon receiving the message, the affiliated website server 31n may acknowledge receipt of the message and the user's order may be fulfilled by the affiliated website server 31n.

As described, the affiliate website server 31n may acknowledge receipt of the message transmitted from the first website server 31. The acknowledge message may be transmitted as an XML message, or any other communication format, from the affiliate website server 31n to the first website server 31 and may include reference parameter information, line item parameter information, vendor reference information, expected ship date, and status information, such as whether the order was fulfilled.

Additionally, the user may elect to drop any order(s) in progress and start over with the ordering/selecting process anew. Accordingly, a start over message may be transmitted from the first website server 31, for example as a GET command via the HTTPS communication protocol optionally passing a session identifier(s) for the affiliated website. This message effectively sends the user back to a partner website when starting the ordering/selecting process anew. Upon the occurrence of an error during the ordering process using the invention, a user may also be redirected back to the affiliated website server 31n. Generally, the redirection message passes a numeric code indicating the error type which caused the user to be redirected back to the affiliated website server 31n.

To ensure that each transaction between the first website server 31 and an affiliated website server 31n is authentic, the integrated shopping cart system 30 may utilize a two-tiered authentication scheme, however, alternative authentication methods may be used without departing from the invention.

In accordance with the invention, the two-tiered authentication includes vendor identifier authentication and IP-based filtering authentication. For example, as described above, each vendor website server 31 may be provided with a unique alpha-numeric code (vendor identifier). The vendor identifier allows an affiliated website server 31n to properly identify a requesting server 31. In addition, to ensure that all requests transmitted to an affiliated website server 31n originated from an authentic server 31, each request message may be validated by comparing the IP (Internet Protocol) address and/or a list of legal referrer addresses of the requesting server 31 against a predetermined list of authentic IP-addresses and/or legal referrer addresses. Accordingly, server requests originating from a non-authentic IP-address and/or referrers can be rejected by the system 30.

In order to implement the integrated shopping cart system 30, the first website server 31 is provided with a test software toolkit that allows the first website server 31 to create and test integration software in a pre-production environment. When the first website server 31 has successfully tested the integration software, the integrated shopping cart system 30 may be implemented. Each of the software sub-modules described above may have an associated test software toolkit module that allows the first website server 31 to test the integration software to ensure the operability of the integrated shopping cart system 30. Preferably, the software toolkit module may reside on the affiliated website server 31n and the first server 31 may access the software toolkit module on the affiliated website server 31n to test the functionality of the integrated shopping cart system 30.

In accordance with the invention, the test software toolkit may have an interface mode and a non-interface mode. The interface mode allows the first website server 31 to access the software toolkit module on the affiliated website server 31n via the Internet. The non-interface mode allows the first website server 31 to test its own integration computer code.

To ensure security of the system 30, the test environment may be protected with a user ID/password combination to ensure that only authorized users have access to the test environment. When testing via the interface mode, preferably, the user ID/password need be supplied by the first server 31 only once. When testing via the non-interface mode, the user ID/password may need be supplied by the first server 31 multiple times. The software toolkit will now be described.

Figure 5:
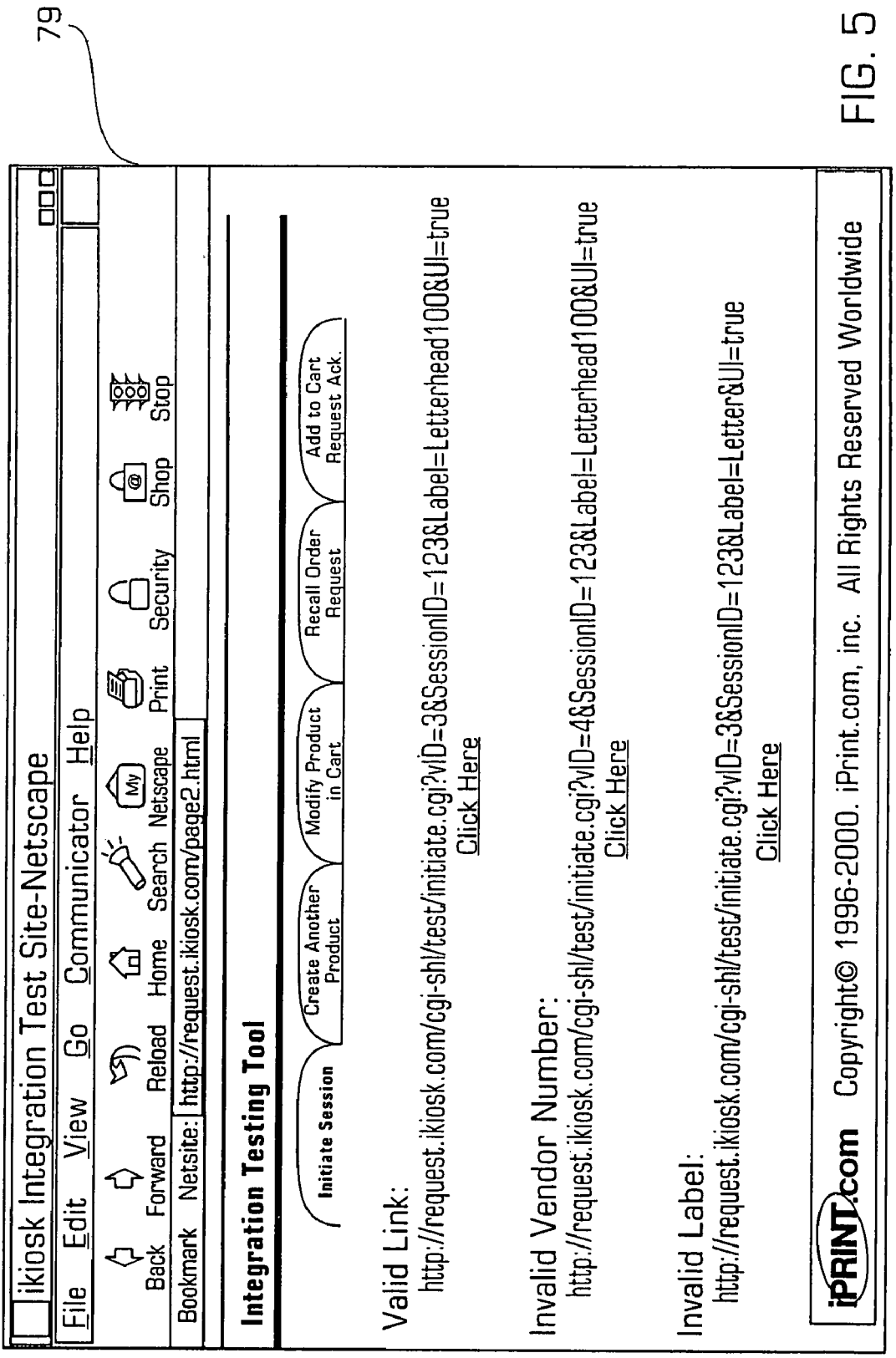
FIG. 5 is an example of a screenshot of a user interface for a toolkit testing software module in accordance with the invention.

FIG. 5 is an example screenshot 79 of the software toolkit module interface. Each of the software sub-modules may be tested via this interface. For example, an initiate session software sub-module of the integration testing software toolkit module allows the first website server 31 to test whether parameter information, such as vendor identifier and product information (label information) are successfully transmitted to the affiliated website server 31n. The test information may be transmitted by the first website server 31 according to known communication protocols, such as an HTTPS POST command.

Depending on whether the test information has been successfully transmitted by the first website server 31, various status messages are returned to the first website server 31 to inform the first website server 31 of any errors in transmission. In the case of encountering an error in transmission, the first website server 31 may correct any indicated errors and retest the submodule.

An add-to-cart sub-module of the testing toolkit allows the first website server 31 to test whether parameter information, such as URL information, reference parameter, line item number, quantity, weight, inventory number, line item description, total line item price and session ID information are successfully transmitted to the affiliated website server 31n. The test information may be transmitted by the first website server 31 according to known communication protocols, such as HTTPS via an XML message.

A modify-product-in-cart sub-module of the testing toolkit allows the first website server 31 to test whether parameter information, such as vendor identifier, reference parameter and line item number information are successfully transmitted to the affiliated website server 31n. The test information may be transmitted by the first website server 31 according to known communication protocols, such as an HTTPS POST command. Depending on whether the test information has been successfully transmitted by the first website server 31, various status messages are returned to the first website server 31 to inform the first website server 31 of any errors in transmission. In the case of encountering an error in transmission, the first website server 31 may correct any indicated errors and retest the sub-module.

A create-another-product sub-module of the testing toolkit allows the first website server 31 to test whether parameter information, such as vendor identifier, reference parameter and line item number information are successfully transmitted to the affiliated website server 31n. The test information may be transmitted by the first website server 31 according to known communication protocols, such as an HTTPS POST command. Depending on whether the test information has been successfully transmitted by the first website server 31, various status messages are returned to the first website server 31 to inform the first website server 31 of any errors in transmission. In the case of encountering an error in transmission, the first website server 31 may correct any indicated errors and retest the sub-module.

A reorder request sub-module of the testing toolkit allows the first website server 31 to test whether parameter information, such as vendor identifier, reference parameter and line item number information are successfully transmitted to the affiliated website server 31n. The test information may be transmitted by the first website server 31 according to known communication protocols, such as an HTTPS POST command.

A ship price request sub-module of the testing toolkit allows the first website server 31 to test whether parameter information, such as reference parameter and line item number information are successfully transmitted to the affiliated website server 31n. The test information may be transmitted by the first website server 31 according to known communication protocols, such as an HTTPS POST command.

Depending on whether the test information has been successfully transmitted by the first website server 31, various status messages are returned to the first web site server 31 to inform the first website server 31 of any errors in transmission. In the case of encountering an error in transmission, the first website server 31 may correct any indicated errors and retest the submodule.

Other software sub-modules may also be tested with the integration testing software toolkit module in accordance with the invention. For example, an order fulfillment request software sub-module of the testing toolkit allows the first website server 31 to test whether parameter information, such as vendor identifier, reference parameter, line item number, vendor reference information, and shipping information are successfully transmitted to the affiliated website server 31n. The test information may be transmitted by the first website server 31 according to known communication protocols, such as HTTPS via an XML message.

An order placement request software sub-module of the testing toolkit allows the first website server 31 to test whether parameter information, such as vendor information, line item information, inventory information, quantity information, description information, and shipping information are successfully transmitted by the first website server 31 according to known communication protocols, such as HTTPS via an XML message.

A ship notification software sub-module of the testing toolkit allows the first website server 31 to test whether parameter information, such as URL information, reference parameter, vendor reference information, line item number and tracking number information are successfully transmitted by the first website server 31 according to known communication protocols, such as HTTPS via an XML message. Depending on whether the test information has been successfully transmitted by the first website server 31, various status messages are returned to the first website server 31 to inform the first website server 31 of any errors in transmission. In the case of encountering an error in transmission, the first website server 31 may correct any indicated errors and retest the sub-module.

A view design software sub-module of the testing toolkit allows the first website server 31 to test whether parameter information, such as vendor identifier information, reference parameter information, line item number and zoom factor information are successfully transmitted by the first website server 31 according to known communication protocols, such as HTTPS via an XML message. Depending on whether the test information has been successfully transmitted by the first website server 31, various status messages are returned to the first website server 31 to inform the first website server 31 of any errors in transmission. In the case of encountering an error in transmission, the first website server 31 may correct any indicated errors and retest the sub-module.

A save design software sub-module of the testing toolkit allows the first website server 31 to test whether parameter information, such as reference parameter information, line item number information, and description information are successfully transmitted by the first website server 31 according to known communication protocols, such as HTTPS via an XML message. Depending on whether the test information has been successfully transmitted by the first website server 31, various status messages are returned to the first website server 31 to inform the first website server 31 of any errors in transmission. In the case of encountering an error in transmission, the first website server 31 may correct any indicated errors and retest the sub-module.

In order to illustrate the operation of the above described integrated shopping cart system 30, the system 30 will be described in the context of a user accessing a first website, such as a business supply store vendor's website, via the Internet 33. The first website may provide URL links to a number of affiliated websites, one such affiliated website being a website that allows a user to create and modify custom designs that may be printed on a variety of print media.

The affiliated websites and the first website together comprise an integrated shopping cart network. Within this network, the affiliated websites include the integrated shopping cart functionality described above so that a user may access the affiliated websites in order to select items for purchase. Upon selecting an item for purchase from an affiliated website, the item may be "placed" into the user's shopping cart at the first website and the user may continue to access other affiliated websites in order to select additional items for purchase. Upon concluding selection, the user may purchase each of the items in the shopping cart at the first website using the e-commerce functionality of the first website.

In describing the operation of the integrated shopping cart system 30 of the invention, the affiliated website server 31*n* will be described in the context of a plurality of servers, together comprising an electronic printing system, such as that described in co-pending U.S. patent application Ser. No. 09/568,644, entitled "Electronic Printing System and Method, filed May 10, 2000, which is incorporated herein by reference. It should be noted however that the following description is intended merely for illustrative purposes and is not considered to be limiting. The integrated shopping cart system 30 can be implemented across any website and its associated server architecture.

Figure 6:
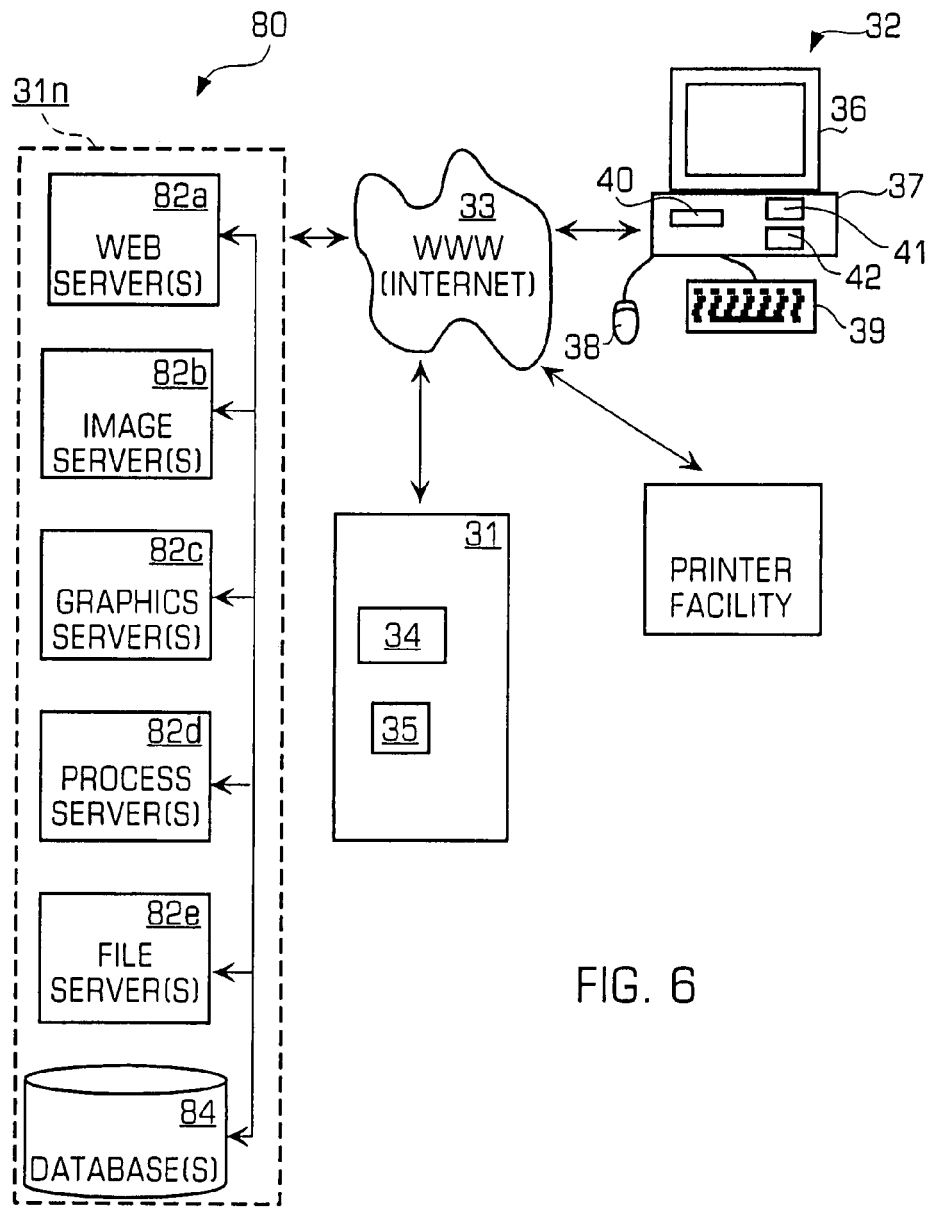
FIG. 6 illustrates an embodiment of an electronic printing system that may be implemented as a part of the integrated shopping cart system of FIG. 2.

FIG. 6 illustrates an embodiment of an electronic printing system 80, such as that described in the above-identified U.S. patent application. The electronic printing system 80 may include an affiliated server 31*n* (that may be embodied as a server hub including a plurality of servers as will be described herein) that may contain one or more pieces of software code 81 that may be stored on various servers 82*a-e*, may be accessible to each server 82*a-e* via the server hub 31*n*, and may be executed by microprocessors 83 in the servers 82*a-e* in order to operate as the electronic printing system 80. The individual servers 82*a-e* may include one or more web servers 82*a*, one or more image servers 82*b*, one or more graphics servers 82*c*, one or more process servers 82*d*, and one or more file servers 82*e*. For simplicity, these servers 82*a-e* collectively represent an affiliated website server 31*n* of the integrated shopping cart system 30 in accordance with the invention.

The function and interrelationship of these servers 82*a-e* will be described in detail herein. While the system 80 is described herein as a plurality of servers 82*a-e*, it should be noted that the system 80 is also capable of being embodied as a single server 31*n*, having systems capable of performing as the electronic printing system 80 of the invention.

A database(s) 84 may include a large number of records, which may be accessed by the various servers 82*a-e*. For example, the database(s) 84 may include records pertaining to user personal information, such as shipping information. The database(s) 84 may also include records pertaining to user billing information, order histories, order status, pricing information, sales tax information, printer information and printer attributes, such as which printer plant may be best utilized for a printing product based, in part, on user location. Additionally, the database(s) 84 may include store attributes, product attributes, shipping carriers, options, and costs, and printer-specific information, such as ink colors and media type. It should be understood that the database(s) 84 may include additional record information that has not been described here, and is not limited to the records set forth herein.

A user may access the electronic printing system 80, such as with the user's browser software program and may create or edit electronic printing templates in a database(s) 84 that may reside on the remote servers 82*a-e*. For example, in accessing the first website the user may be provided with a URL link that will navigate the user to an affiliated website, such as one associated with the electronic printing system 80, when selected by the user.

Figure 7:
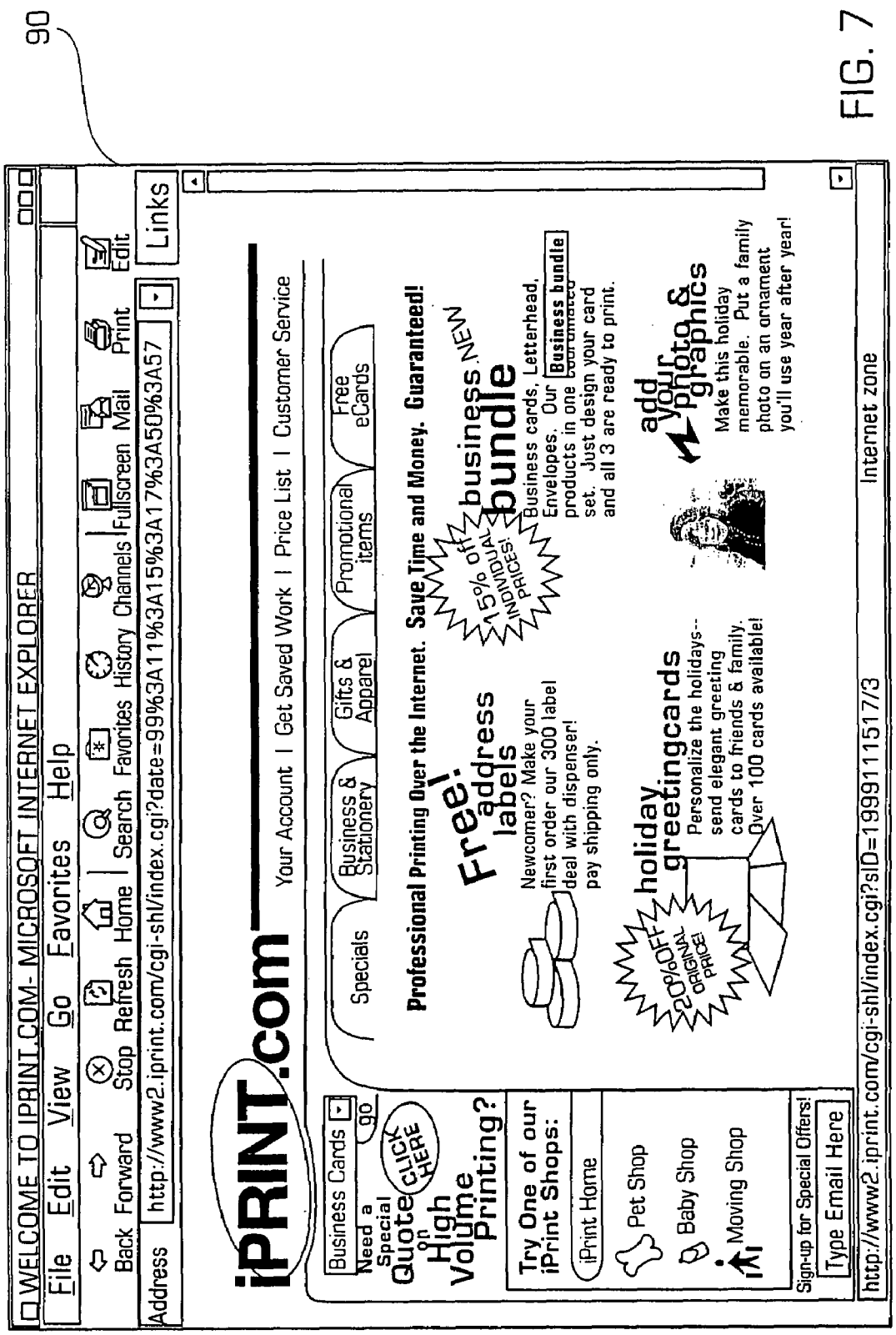
FIG. 7 shows an example of a screen shot of a user interface that may be displayed to a user upon the user accessing the electronic printing system of FIG. 5.

When selecting the URL link at the first website that is associated with the electronic printing system 80, the user may be electronically transferred to a user interface screen of the electronic printing system 80. FIG. 7 shows an example of a screen shot of the user interface 90 screen that may be displayed to the user upon the user accessing the electronic printing system 80.

The user may interact with the electronic printing system 80 via the user interface 90. For example, the user may design a custom print order via the user interface 90 by initiating a design request for a custom print design and submit the custom design for processing and printing. Additionally, a user may modify the design, in which case the design change is automatically represented in the design files and conveyed graphically to the user, as will be described.

A custom print design may include custom print information, such as graphical information, audio-visual information, image information, textual information, etc. Such information can be stored as binary data or ASCII characters (the ASCII characters or binary data define text information and may also define generic file information).

Upon the user creating a custom print design, the electronic printing system 80 may store the design information until an order is placed. Every order may have an order file and one or more associated design files. The design files may describe the initial layout of a print design and may reflect updates to the initial layout based upon the custom design created by a user. The design files may also describe non-print items associated with the custom print information, such as second sheets, etc.

An imaging engine (resident on an image server 82*b*) may convert the information in the design files into a graphic file for on-screen representation and a process server 82*d* may convert the design files into a "ready-to-print" output file that may be retrieved electronically by a remote printer facility. The output file may be formatted as an image file format, such as a raster file format or a vector file format. The image file format can be, for example, an EPS file format, a .JPG file format, a .GIF file format, a .PDF file format, textual, or any other such format.

The order file may contain user information and product data, such as a user's shipping address, pricing information, and the media type desired. When an order is submitted, such as by the user at the first website choosing to purchase a design item in the user's shopping cart that the user created or modified using the electronic printing system 80, both the order file and the design files may be staged for conversion. These files may be converted to printer specific files and may be sent to or retrieved by a local or remote printing facility and the user's order may be carried out by the printing facility and may be sent to the user when completed. Upon carrying out the user's order, in accordance with the invention, the user may be notified that the user's order has shipped.

Upon the user selecting a desired product to design, a list of pre-designed templates may be displayed to the user, from which the user may select a default design template to begin customizing a print design order. A graphical representation of a default design template 95 may be displayed to the user (FIG. 8A) that the user may then customize and modify to create a desired design. It should be noted that a user is not bound to the selected product template. Product layouts may be changed at any time.

Figure 8A:
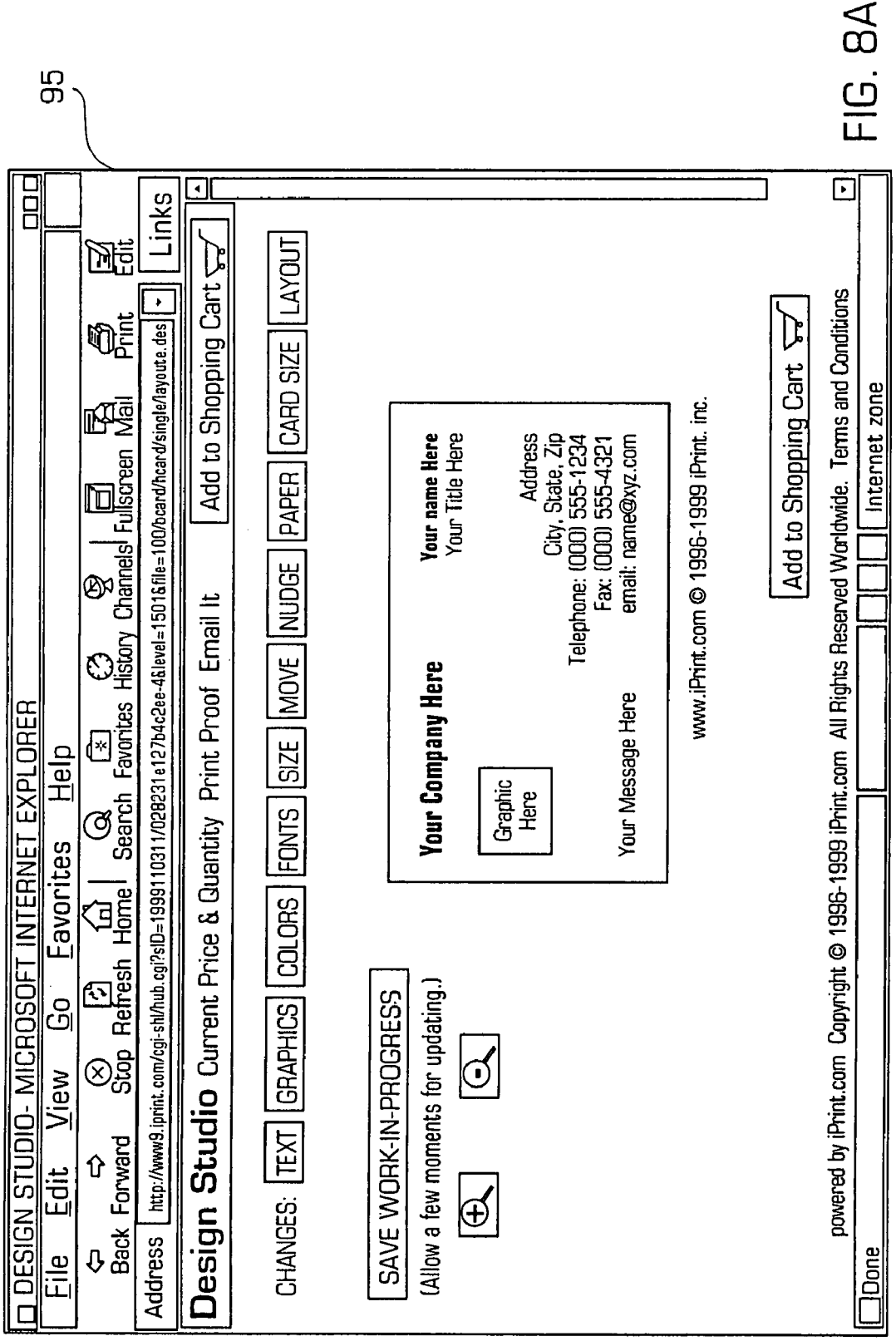
FIG. 8A is a graphical representation of a default design template that a user may customize and modify to create a desired design.
Figure 8B:
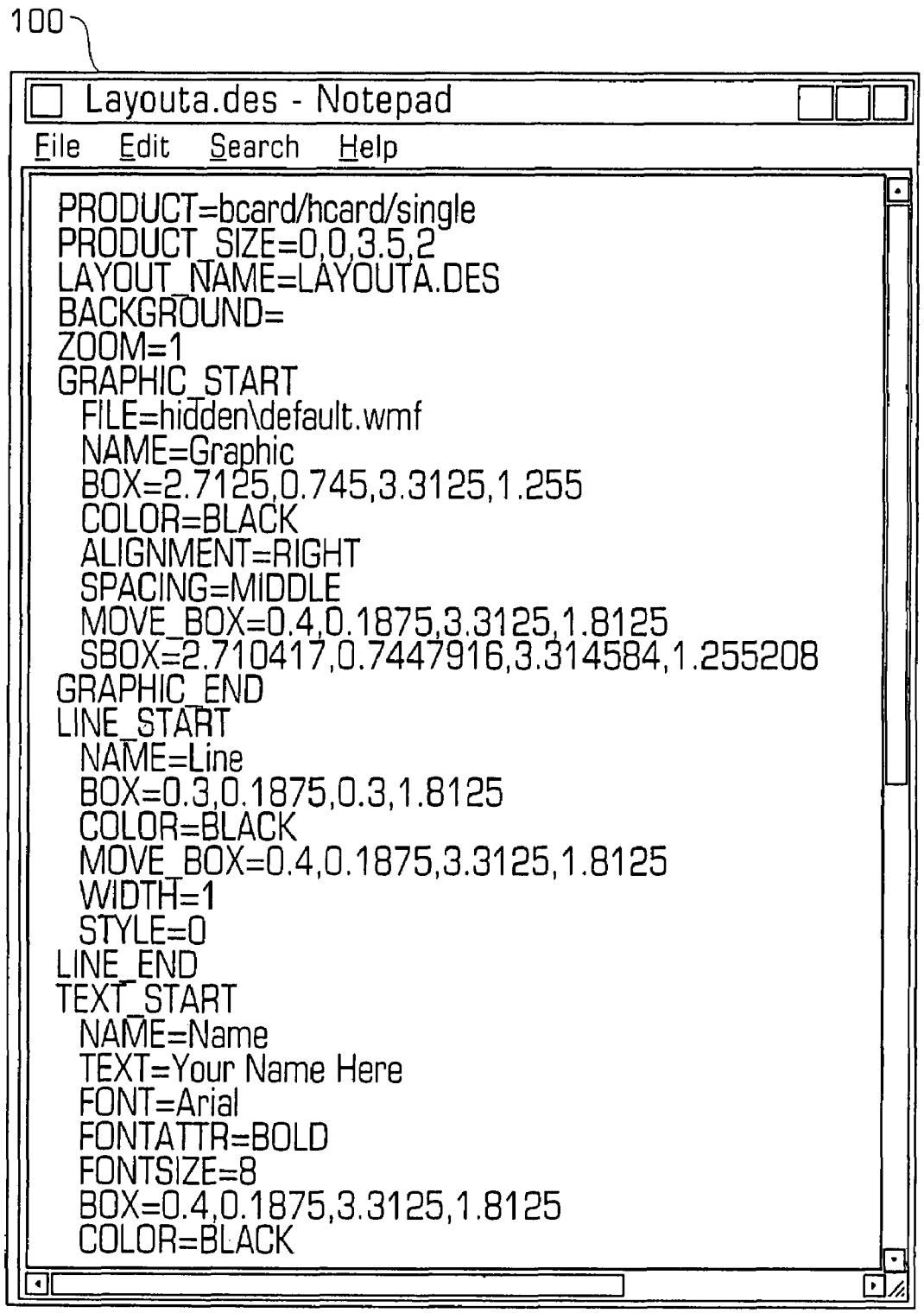
FIG. 8B illustrates an example of a design file that may be created by the electronic printing system in accordance with the changes that the user may make to the default design template shown in FIG. 8A.

FIG. 8B illustrates an example of a design file 100 that may be created by the electronic printing system 80 in accordance with the changes that the user may make to the default design template such as shown in FIG. 8A. The design file 100 may be updated in real time to reflect the changes. Generally, every print item, such as a business card, a T-shirt, a mug, etc., has associated design files, per side, that describes the design layout. The design files may be structured textual document files that may describe the initial layout of the design item, the placement of objects in the design item, and attributes of those objects. As a user modifies a default design file for a print order, for example by entering text, moving or coloring an object, new design files may be created by the system 80 to reflect the modifications to the default design layout which may then be sent to the image server 82*b* to create a new image that may be displayed to the user reflecting the modifications.

Figure 8C:
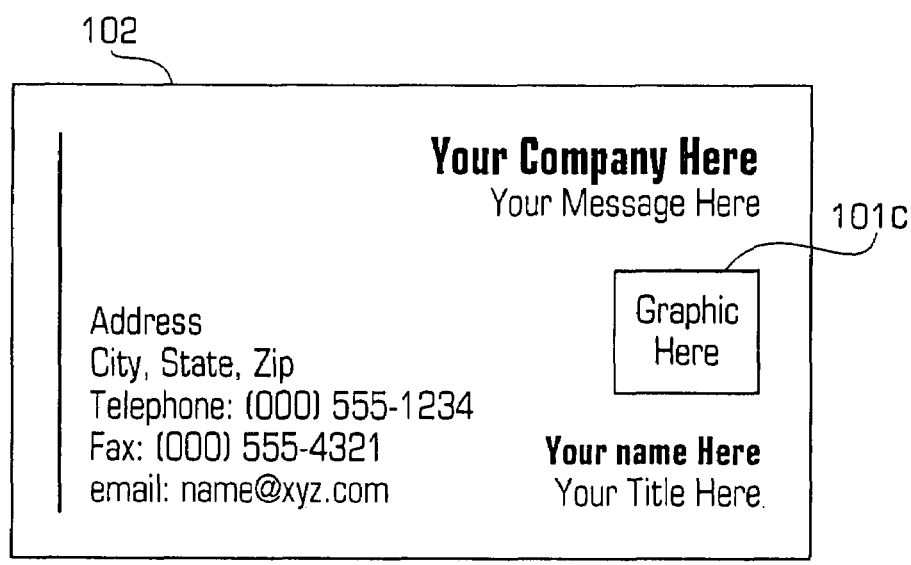
FIG. 8C shows an associated graphical representation of the design file of FIG. 8B that may be displayed to a user in real-time to reflect modifications to a default design file.

FIG. 8C shows an associated graphical representation 102 of the design file 100 of FIG. 8B that may be displayed to a user in real-time to reflect modifications to a default design file. In particular, the image server 82*b* may parse the textual information included in the design files and may return a graphical image 101*c* (stored on the graphics server 82*c*) representative of the design described by the design files to be displayed to the user in real-time. The image server 82*b* may convert the textual information into a GIF graphic, or any other graphic file, that may be a screen representation of the layout of the custom design. Therefore, a user may be able to immediately visualize the changes and modifications that are made to a custom design before accepting the design.

Thus, in operation, upon a user accessing the electronic printing system 80, such as from the first website, the user may access a user interface (shown in FIG. 7) provided by a web server 82*a*. The user interface may provide an interactive design tool to the user so that the user may create a custom print design. The web server 82*a* may be configured to retrieve the custom design information input by the user and may create and update design files accordingly.

When a user initiates a design function from the interface design tool, graphics information may be obtained from the graphics storage location (the graphics may be stored on the image server 82*b*, the file server 82*e*, or any server capable of storing image data) and may be conveyed to an image server 82*b* so that the graphics information may be parsed into image files that may be displayed to a user, such as via the user's browser software program, to reflect user modifications to an initial design.

Figure 9:
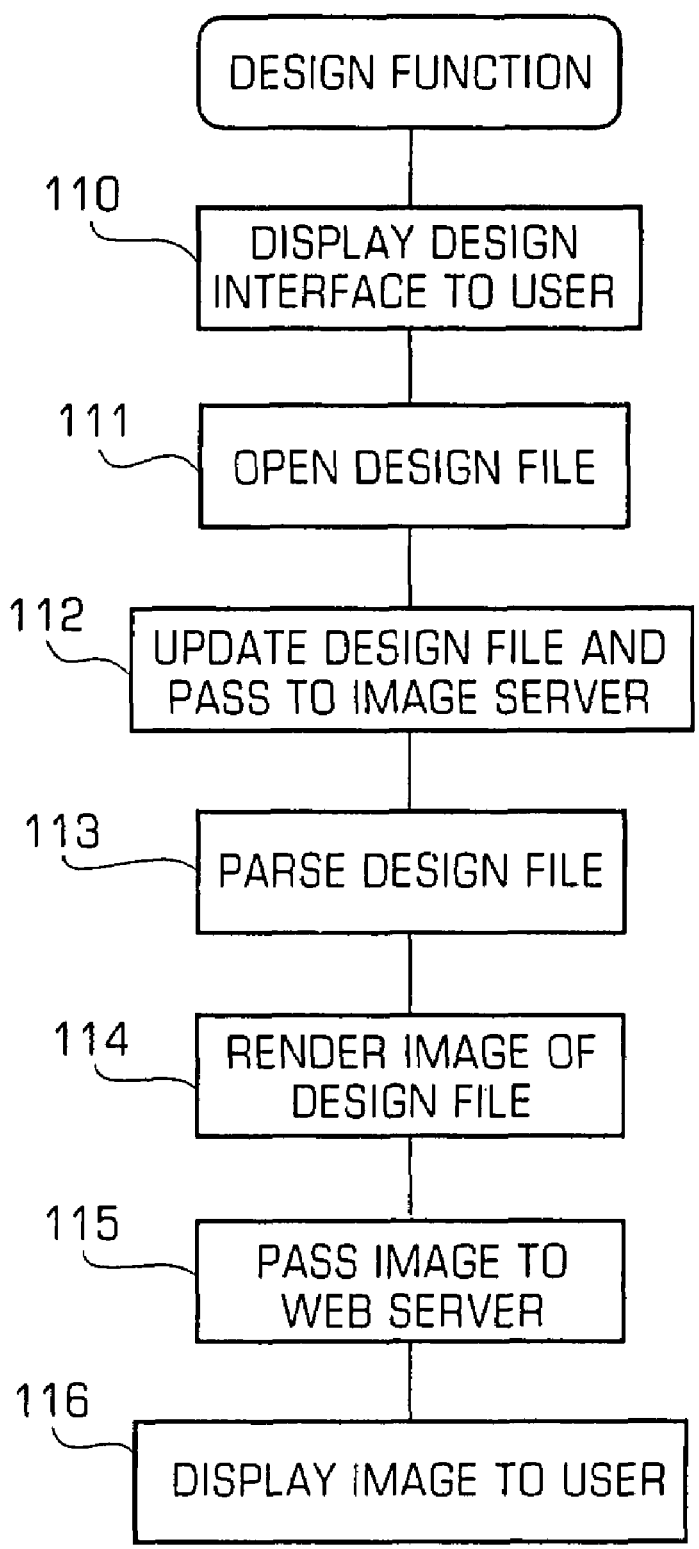
FIG. 9 is a flowchart illustrating the operation flow of the electronic printing system shown in FIG. 6 when a user initiates a local design function.

FIG. 9 is a flowchart illustrating the operation flow of the electronic printing system 80 (see FIG. 6) when a user initiates a local design function. A design tool interface 90 (see FIG. 7) may be displayed to the user through the browser interface (Step 110). A web server 82*a* (see FIG. 6) may open a default design file for a selected design product and may initiate the creation of a new item in an order (Step 111). The design options that are presented to a user may be dependent on the design rules located in the database(s) 84. The web server 82*a* may update the design files to reflect a change made by the user to the default design and may pass this information to the image server 82*b* (Step 112), where the information may be parsed (Step 113) and rendered as an image file (Step 114) and returned to the web server 82*a* (Step 115) and downloaded by the user for display to the user through the user interface (Step 116).

The image server 82*b* may include a graphics conversion program that may parse textual information (from design files) into graphical images so that the web server 82*a* may convey these graphical images to the user through the browser interface 90 in real time. Thus, every time a user modifies a design by modifying design files, the web server 82*a* may update the design information and pass that information to the image server 82*b*. The image server 82*b* may parse the textual information, render a graphical image reflecting the design update, and return the graphical image to the web server 82*a* so that it may be displayed to the user through the browser interface. When the user is content with the custom design, the user may accept the design, in which case the design item may be "placed" in the user's shopping cart at the first website, as described above. Upon the user completing a shopping order, the user may choose to purchase the design item, in which case the design order may be submitted to the electronic printing system 80 for processing.

Upon the user completing a shopping cart order at the first website and choosing to purchase the selected design item, printer specific files for the design item may be generated by the electronic printing system 80. These printer specific files may contain information such as what printer to send the file to and inventory codes that may be printer specific such as product, ink color, quantity, etc. The electronic printing system 80 may then stage the order (as printer specific files, such as BEP and image files) so that the order may be retrieved electronically by a remote printing facility.

In order to convert the design files into an image file that may be utilized by any remote printing facility (such as an encapsulated postscript file, EPS file), the design files are processed by the electronic printing system 80. The process server 82*d* (see FIG. 6) may be configured to process orders received from the first website server 31 and output files that may be retrieved by a remote printing facility.

Figure 10:
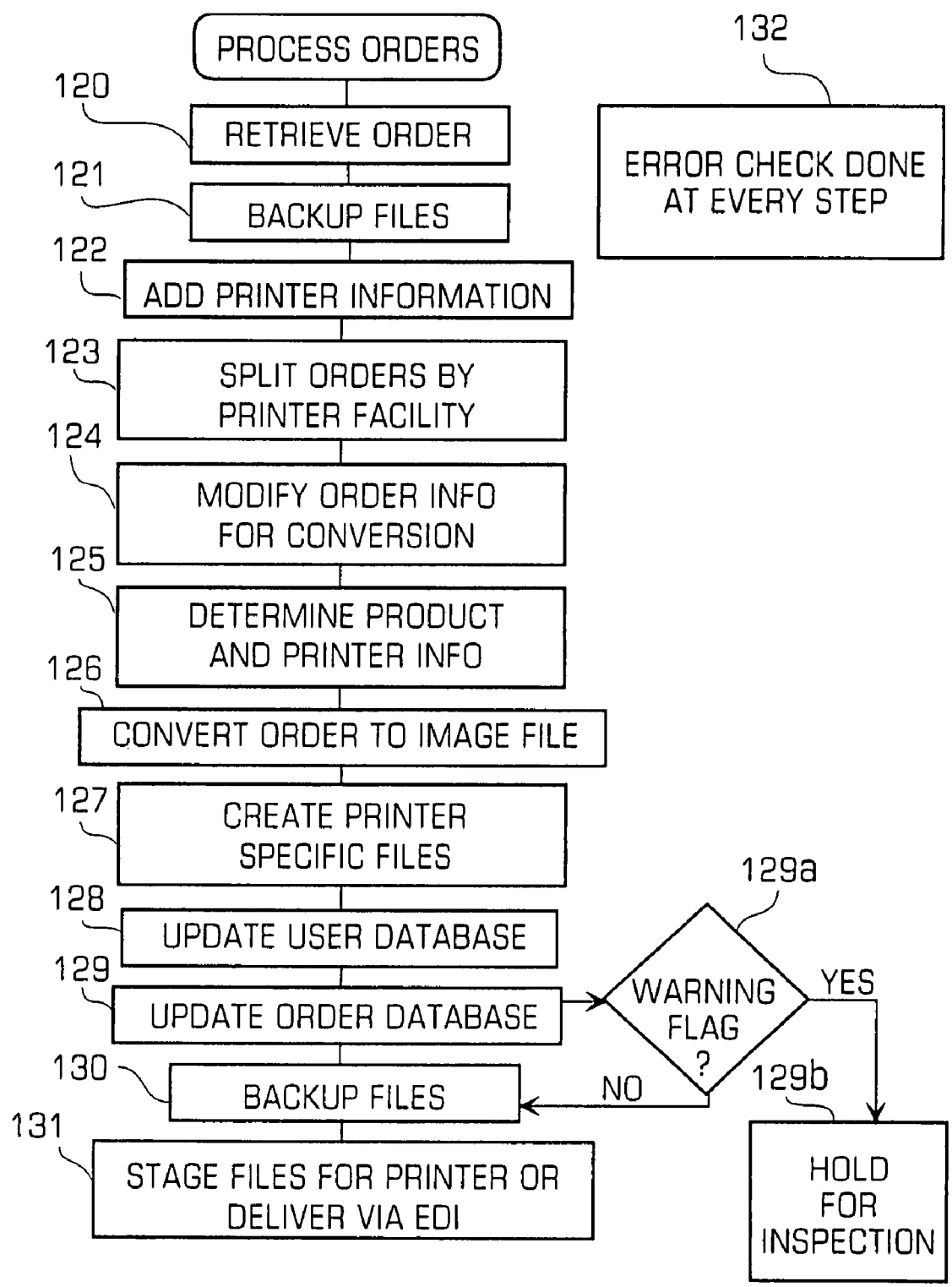
FIG. 10 illustrates the operational flow of the process server of the electronic printing system shown in FIG. 6.

FIG. 10 illustrates the operational flow of the process server 82*d*. Initially, the process server 82*d* may retrieve an order that may have been submitted by the first server 31 and staged by the electronic printing system 80 in a staging directory resident on a file server 82*e* or resident in a database(s) 84. In retrieving the order, the process server 82*d* may access the staging directory or database(s) 84 and locate a staged order and all associated files that may have been stored by the electronic printing system 80 (Step 120). After the staged order has been retrieved by the process server 82*d*, the files are backed up (Step 121) and printer facility information may be added to the staged order (Step 122). This information may be determined at the time the user is designing the custom print order. After adding the printer facility information to the order, the process server 82*d* may split orders, for example, by printer facility (Step 123).

Once a print order has been completed by the process server 82*d*, the process server 82*d* may modify the order in preparation for conversion of the design files to an image file (Step 124). For example, all non-printable information may be removed from the design files. The process server 82*d* may then determine product and printer facility information from the order file (Step 125), and parse the design files into an image file, such as an EPS file (Step 126), that may be utilized by a printer facility. The image file could be of any image-type format.

Both spot printing plates and CMYK printing plates may be defined in the image file, among other printing plate designations, such as composite spot printing plates, etc. Spot printing plates utilize a black background printing plate to which different color ink may be added in order to create a print. For example, in the case of a print order in which a business card having a green ink color portion thereon may be defined in a design files, the image file may specify a black background plate and a green ink preference or may be defined on a secondary information file. CMYK printing plates may use four separate plates, cyan, magenta, yellow and black, or a composite plate for full color printing. Process color printing information, such as CMYK information, RGB (red, green, blue) information, or other color information where each color is represented as a separate printing plate. Process color printing information may be represented in separate printing plates or as a composite plate. This information may be specified in the image file.

Depending upon the product ordered by a user and/or the designated printer facility, the process server 82*d* may retrieve an order number associated with the order request and may create a printer specific file associated with the information that may not be included in the converted image file, such as product, paper color, media type, etc (Step 127). Printer specific files may include printer facility specific information, such as attributes and the like.

The process server 82*d* may then add the user information to a user database(s) 84 (Step 128) and may update an order database(s) 84 with the user order information (Step 129). The process server 82*d* may then backup all the printer specific files (Step 130) and compress them, such as by zipping the printer files, and copy the compressed files to an appropriate location so that the compressed files may be downloaded by a remote or local printer facility (Step 131) or stage to an EDI server on an order by order basis. The printer specific files may include printer identification information, or printer specific inventory codes, such as product information codes, ink color codes, quantity information codes, etc. The process server 82*d* may also include a backend module for tracking order ship status and for notifying customers of shipped orders. Operation of the integrated shopping cart system will now be described in the context of being integrated with an electronic printing system.

Figure 11:
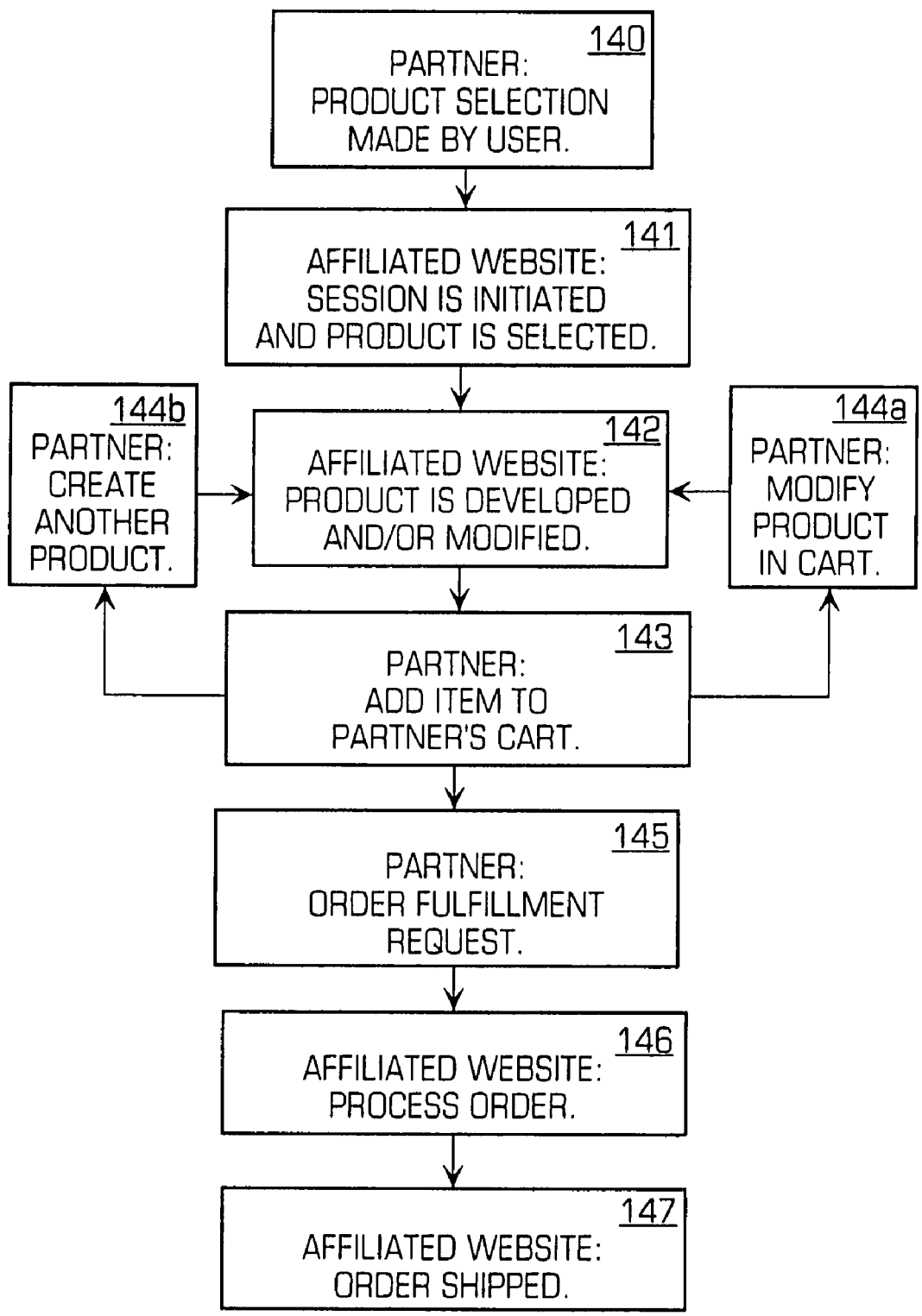
FIG. 11 is a flow chart illustrating the process flow of the integrated shopping cart system in accordance with the invention.

FIG. 11 is a flowchart illustrating the operation flow of the integrated shopping cart system 30 of the invention. Indicated in each block of the flowchart is an action performed by the system in response to a request by a user, together with the server responsible for performing the requested action.

As shown in FIG. 11, a user at the first website may choose to select a product from an affiliated website (Step 140). Thus, the user may, for example, select a URL link on the first website to navigate to an affiliated website in order to select a product, such as to create a custom design item from the affiliated website.

An integrated shopping cart session may be initiated between the first server 31 and the affiliated website server 31*n*, for example by activating the session initiation software sub-module 51 of the integrated shopping cart system software module 50. After a session has been initiated, a user may choose to select a custom design item from the affiliated website (Step 141). The custom design item may include print information as well as non-print information. For example, the custom design item may include non-printable items where no custom design work is involved in creating the item (i.e., using a default template).

After selecting a product for custom design, the user may then design a custom print design, as described above and may modify the custom print design until acceptable by the user (Step 142). The user may then choose to add the designed item to the user's shopping cart at the first website (Step 143).

After adding the designed item to the shopping cart, the user may choose to modify a product already in the shopping cart (Step 144*a*) or may choose to create another product (Step 144*b*). In either case, the user may create and/or modify a custom print design until acceptable by the user (Step 142). The user may then choose to add the designed item to the user's shopping cart at the first website (Step 143).

When the user has completed a shopping cart selection and is ready to complete an order, the user, at the first website, may choose to fulfill an order request (Step 145). Upon a user choosing to fulfill an order request, the affiliated website server 31*n* from which an item has been selected by a user may be notified of the user's request to fulfill an order (Step 146). Upon the affiliated website fulfilling an order, the affiliated website may notify the first website and/or the user, of the fulfillment of an order, such as the shipping of the order (Step 147).

Figure 12:
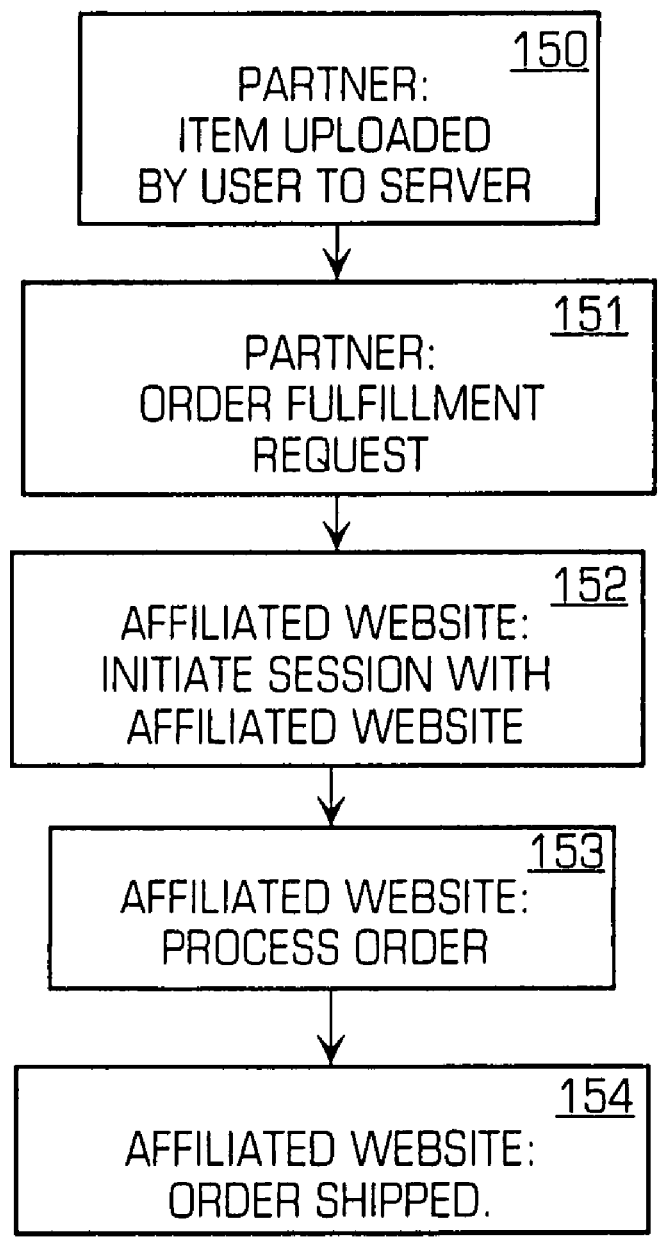
FIG. 12 is a flowchart illustrating the operation flow of the order fulfillment of an uploaded data file in accordance with the invention.

FIG. 12 is a flowchart illustrating the operation flow of an alternative embodiment of the integrated shopping cart system 30 of the invention in which order fulfillment of an uploaded item, or an item selection item that may be resident on the first website itself, may be performed by the system 30. Indicated in each block of the flowchart is an action performed by the system in response to a request by a user, together with the server responsible for performing the requested action.

As shown in FIG. 12, a user at the first website may choose to upload an item, for example, a data file representing an object to be added to the shopping cart, or select from an item existing at the first website to be added to the shopping cart at the first website (Step 150). When the user is ready to complete a shopping cart order, the user, at the first website, may choose to fulfill an order request (Step 151). An integrated shopping cart session may then be initiated between the first server 31 and the affiliated website server 31*n*, for example by activating the session initiation software sub-module 51 of the integrated shopping cart system software module 50 (Step 152). Upon a user choosing to fulfill an order request, an affiliated website server 31*n* which may be configured to perform a specified function, such as printing or otherwise processing the uploaded data file or the selected item, may be notified of the user's request to fulfill an order (Step 153). Upon the affiliated website fulfilling an order, the affiliated website may notify the first website and/or the user, of the fulfillment of an order, such as the shipping of the order (Step 154).

Figure 13:
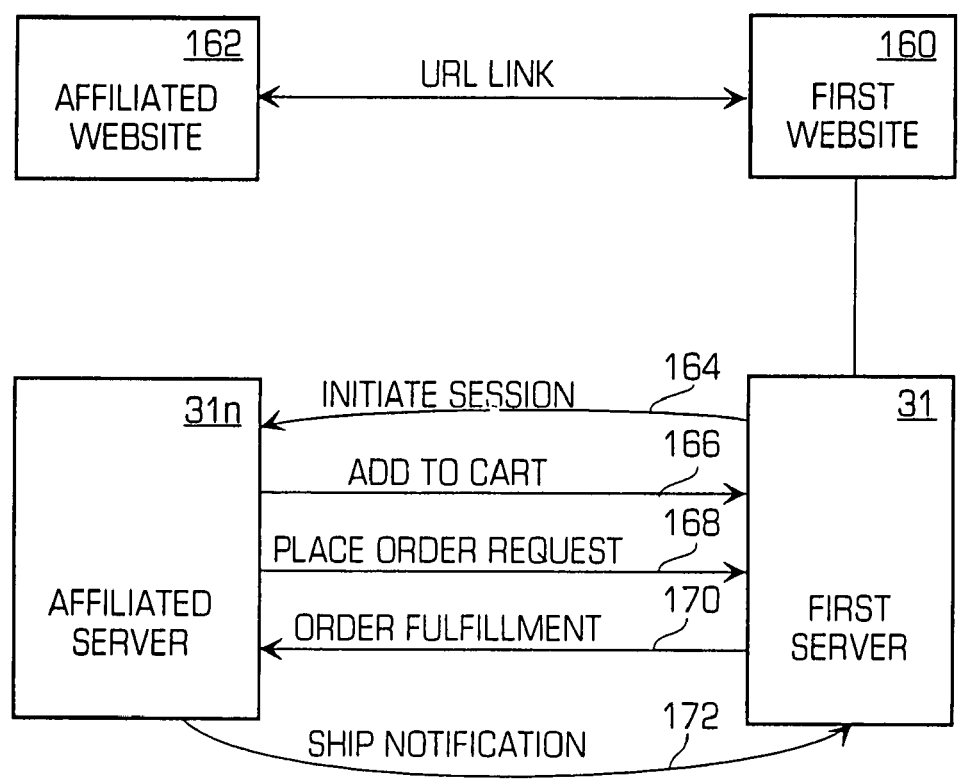
FIG. 13 is a schematic diagram illustrating the operation of the integrated shopping cart system in accordance with the invention.

FIG. 13 is a schematic diagram illustrating the operation of the integrated shopping cart system in accordance with the invention. A user accessing a first website 160 (hosted, for example, by a first server) may be presented with a dynamic link, such as a URL link, to an affiliated website 162 (hosted, for example, by an affiliated server in communication with the first server). The first website 160 may include an electronic shopping cart software application for facilitating commercial transactions between the user and any of the first website 160 or affiliated websites 162 so that the user can purchase products and/or services provided by any of the proprietors of the websites.

As described above, in accordance with the invention, a user may access an affiliated website and may select products and/or services for purchase from the affiliated website 162. As shown in FIG. 13, upon a user accessing an affiliated website 162 the first server 31 may transmit an initiate message 164 to the affiliated server 31*n* to initiate a communication session with the first server 31. When a session has been initiated between the first server 31 and the affiliated server 31*n*, a user accessing an affiliated website 162 (hosted by the affiliated server 31*n*, for example) may select products and/or services for purchase from the affiliated website 162.

Upon a user selecting a particular product and/or service from the affiliated website 162 for purchase, the affiliated server 31*n* may transmit an add-to-cart message 166 to the first server 31 indicating to the first server 31 to reflect the user's selection in a shopping cart order maintained by the first server 31. Therefore, a user accessing an affiliated website 162 can select products and/or services for purchase from the affiliated website 162 and the selected items can be maintained in a shopping cart order by the first server 31 and displayed to the user accessing the first website 160.

A user, after selecting items for purchase from an affiliated website 162, may choose to place an order for any or all of the items indicated in the user's shopping cart order maintained by the first server 31. Upon placing a request for an order 168, the first server 31 may implement its own commercial functionality to properly process the order. In processing the order by the first server 31, order processing and order fulfillment of products and/or services selected for purchase from an affiliated website 162 may be performed by the affiliated website server 31*n*. For example, the first server 31 may transmit an order fulfillment request message 170 to the affiliated server 31*n* requesting the affiliated server 31*n* to perform its own order fulfillment processing, such as producing and shipping 172 a selected item. After shipping the selected item, the affiliated server 31*n* may transmit a ship notification message 174 to the first server 31 alerting the first server 31 that the affiliated server 31*n* has properly processed and shipped the order. The first server 31 may then properly notify 176 the user that the order has been successfully processed and shipped.

Thus, in accordance with the invention, integrated shopping cart functionality is provided on a first website so that products/services from different affiliated websites (or even uploaded data files from a user) can be integrated into the shopping cart at the first website and the e-commerce functionality of the first website can be utilized to purchase the selected products/services (or otherwise process the uploaded data files).

Advantageously, the first website is benefited by this integrated shopping cart functionality in that an increased number of users may access the first website since the proprietor of the first website may offer various products/services from a multitude of different affiliated websites, for example by providing URL links to the affiliated websites that a user may access in order to select items from the affiliated websites. These items can be integrated into the shopping cart at the first website and purchased with a single transaction. Increased user traffic is expected since a user's shopping interests can be fulfilled at a single website.

Additionally, affiliated websites are benefited by this integrated shopping cart functionality since the e-commerce functionality of the integrated shopping cart is performed by a server that is associated with the first website. Therefore, affiliated websites need not include their own e-commerce functionality. Instead, they may take advantage of the e-commerce functionality of the first website and still receive the benefits of the sale of their offered products/services to the user. Maintenance costs and overhead costs with respect to including an e-commerce software engine are therefore reduced and often eliminated as a result.

While the foregoing has been described with reference to particular embodiments of the invention, such as an integrated shopping cart system, it will be appreciated by those skilled in the art that changes in these embodiments may be made without departing from the principles and spirit of the invention.

What is claimed is:

1. An electronic shopping cart system integrated with a computer network connecting a plurality of servers together, the computer network being accessible by a user, comprising:

a first server associated with a first website, the first server including a shopping cart application that functions as a hub for items that can be selected by a user accessing one or more of a plurality of websites and configured to maintain a shopping cart order of any such items selected by the user, and a catalog application adapted to receive item information relating to the items that can be selected by the user accessing one or more of the plurality of affiliated websites, the first server being configured to process the shopping cart order and to provide order fulfillment information to the affiliated websites from which the items were selected by the user; and a plurality of affiliated servers associated with the plurality of affiliated websites, each of the affiliated servers including a respective catalog of item information relating to the items that can be selected from the respective affiliated websites, the plurality of affiliated servers being adapted to provide the respective catalogs of item information to the first server and to receive and process the order fulfillment information from the first server.

2. The integrated shopping cart system of claim 1, wherein the computer network is the World Wide Web.

3. The integrated shopping cart system of claim 1, wherein the items include products and services.

4. The integrated shopping cart system of claim 1, wherein the item information includes any of item identification information, cost information, and description information.

5. The integrated shopping cart system of claim 1, wherein the order fulfillment information includes any of item identification information and shipping information.

6. An electronic shopping cart system integrated with a computer network connecting a plurality of servers together, the computer network being accessible by a user, comprising:

a server associated with a first website, the server including a shopping cart application that functions as a hub for items that can be selected by a user accessing one or more of a plurality of websites and configured to maintain a shopping cart order of any such items selected by the user, and a catalog application adapted to receive item information relating to the items that can be selected by the user accessing one or more of the plurality of affiliated websites, the server being configured to process the shopping cart order and to provide order fulfillment information to the affiliated websites from which the items were selected by the user.

7. The integrated shopping cart system of claim 6, wherein the computer network is the World Wide Web.

8. The integrated electronic shopping cart system of claim 6, wherein the items include products and services.

9. The integrated electronic shopping cart system of claim 6, wherein the item information includes any of item identification information, cost information, and description information.

10. The integrated shopping cart system of claim 6, wherein the order fulfillment information includes any of item identification information and shipping information.

* * * * *